United States Patent
Baek et al.

(10) Patent No.: US 11,259,157 B2
(45) Date of Patent: Feb. 22, 2022

(54) V2X COMMUNICATION DEVICE AND COMMUNICATION METHOD THEREOF

(71) Applicant: LG ELECTRONICS INC., Seoul (KR)

(72) Inventors: Jongseob Baek, Seoul (KR); Woosuk Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 96 days.

(21) Appl. No.: 16/770,875

(22) PCT Filed: Dec. 14, 2017

(86) PCT No.: PCT/KR2017/014752
§ 371 (c)(1),
(2) Date: Jun. 8, 2020

(87) PCT Pub. No.: WO2019/117367
PCT Pub. Date: Jun. 20, 2019

(65) Prior Publication Data
US 2020/0336871 A1    Oct. 22, 2020

(51) Int. Cl.
*H04W 4/40* (2018.01)
*H04W 48/08* (2009.01)
*H04W 72/04* (2009.01)

(52) U.S. Cl.
CPC ............ *H04W 4/40* (2018.02); *H04W 48/08* (2013.01); *H04W 72/0406* (2013.01)

(58) Field of Classification Search
CPC ..... A61B 5/0002; A63F 13/30; B60R 16/023; B60W 16/023; B64C 39/024; B64D 11/0015; G01V 1/22; G05B 19/4185; G05D 1/00; G05F 1/00; G07C 5/00; G08G 5/00; H03M 7/30; H04B 1/202; H04B 7/18506; H04L 1/0007; H04L 1/0014;
(Continued)

(56) References Cited

U.S. PATENT DOCUMENTS 7,394,778 B2 * 7/2008 Kim .................... H04W 72/005
                                                      370/312
8,578,002 B1 * 11/2013 Roesch ............... H04L 63/1433
                                                      709/220
(Continued)

FOREIGN PATENT DOCUMENTS

CN         107493254 A   * 12/2017   ........... H04W 40/02
KR    10-2006-0076410        7/2006
(Continued)

OTHER PUBLICATIONS

Wang S Y et al: "Improving the Channel Utilization of IEEE 802.11p/1609 Network," Wireless Communications and Networking Conference, 2009, WCNC 2009. IEEE, Piscataway, NJ Apr. 5, 2009, pp. 1-6, XP031454247.
(Continued)

*Primary Examiner* — Thomas R Cairns
(74) *Attorney, Agent, or Firm* — Dentons US LLP

(57) ABSTRACT

A communication method of a V2X communication device is disclosed. The communication method includes accessing a first channel; receiving a network protocol data unit (NPDU) including a service advertisement message (SAM) on the first channel; and based on the service advertisement message, accessing a service channel and receiving service data.

14 Claims, 23 Drawing Sheets

(58) Field of Classification Search
CPC .......... H04L 12/2806; H04L 29/08648; H04L 29/0899; H04L 41/5058; H04L 47/365; H04L 67/00–42; H04L 67/104; H04L 67/12; H04L 67/125; H04L 67/18; H04L 69/04; H04L 69/32; H04M 11/002; H04M 11/007; H04M 11/04; H04W 4/18; H04W 4/40–48; H04W 8/005; H04W 8/20; H04W 28/06; H04W 28/065; H04W 36/0072; H04W 40/24; H04W 48/08–16; H04W 72/0406–0433; H04W 76/00; H04W 80/02; H04W 84/18
See application file for complete search history.

(56) References Cited

U.S. PATENT DOCUMENTS

| | | | | |
|---|---|---|---|---|
| 10,003,660 | B2* | 6/2018 | Furr | H04L 45/566 |
| 11,140,218 | B2* | 10/2021 | Tidemann | H04L 47/2483 |
| 2005/0185608 | A1* | 8/2005 | Lee | H04W 28/06 |
| | | | | 370/328 |
| 2015/0134851 | A1* | 5/2015 | Relan | H04L 45/126 |
| | | | | 709/241 |
| 2016/0037483 | A1* | 2/2016 | Du | H04B 17/318 |
| | | | | 370/252 |

FOREIGN PATENT DOCUMENTS

| | | | | |
|---|---|---|---|---|
| KR | 10-0924833 | 11/2009 | | |
| KR | 10-1075021 | 10/2011 | | |
| KR | 10-1106493 | 1/2012 | | |
| KR | 20140129086 A | * 11/2014 | ........ | H04W 72/0446 |
| KR | 10-1567212 | 11/2015 | | |
| WO | WO-2015180046 A1 | * 12/2015 | ........... | H04W 40/02 |
| WO | WO-2020042986 A1 | * 3/2020 | ........... | H04L 43/028 |
| WO | WO-2021086462 A1 | * 5/2021 | ............. | H04L 69/22 |

OTHER PUBLICATIONS

Anders Hjelmare et al: "Service Annoucement using IEEE Wave Service Advertisement as a model: ITSWG2 (14) 000032r2_Service_Annoucement," ETSI Draft; Sophia-Antipolis, France, Apr. 14, 2014, pp. 1-10, XP014212665.

Lecit Consulting S R L: "ISO 16460"ETSI draft; European Telecommunications Standards Institute, Sophia-Antipolis, France, Architecture and Cross-Layer, Apr. 5, 2016, pp. 1-54, XP014270570.

* cited by examiner

[Figure 1]
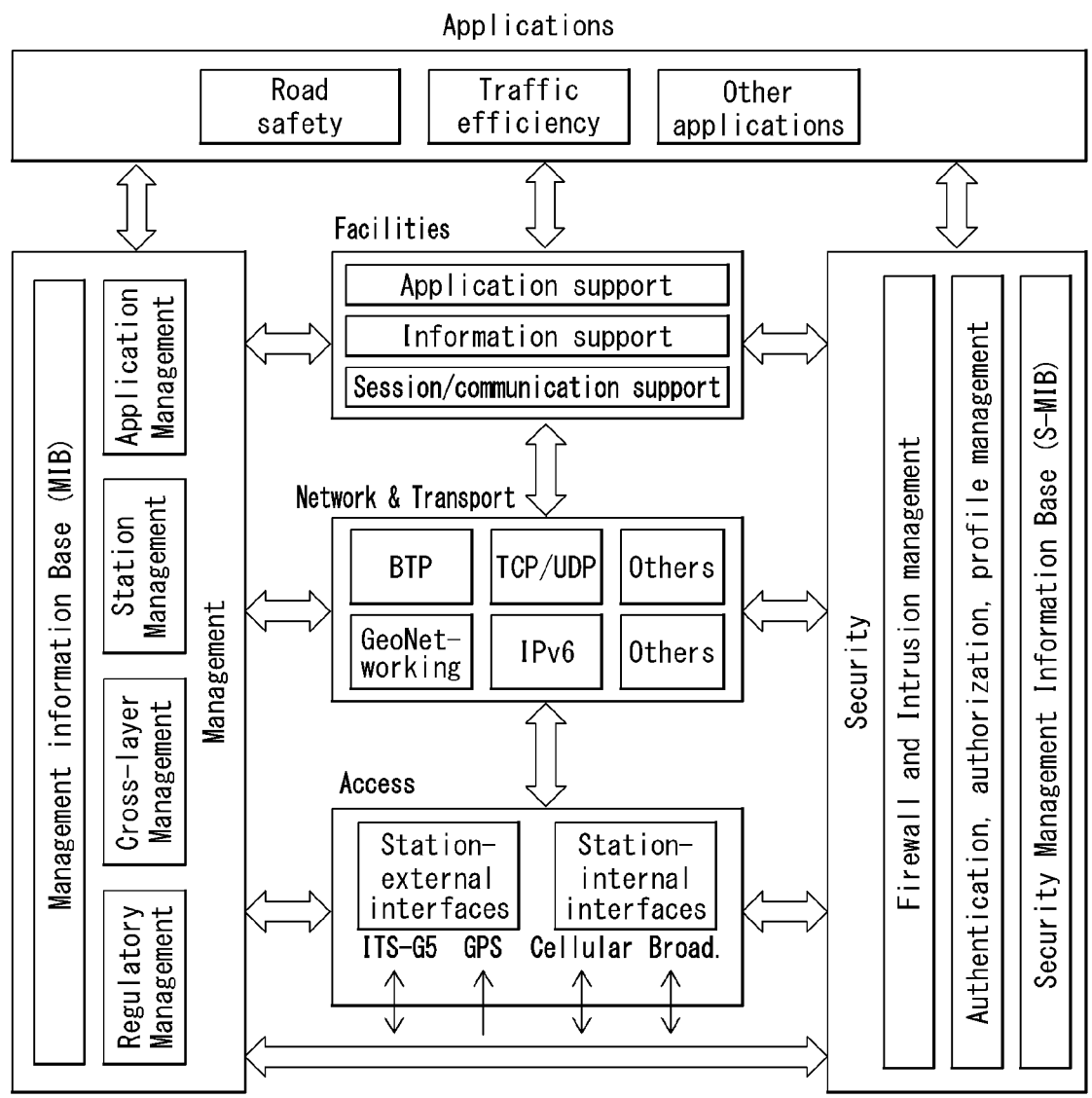

[Figure 2]
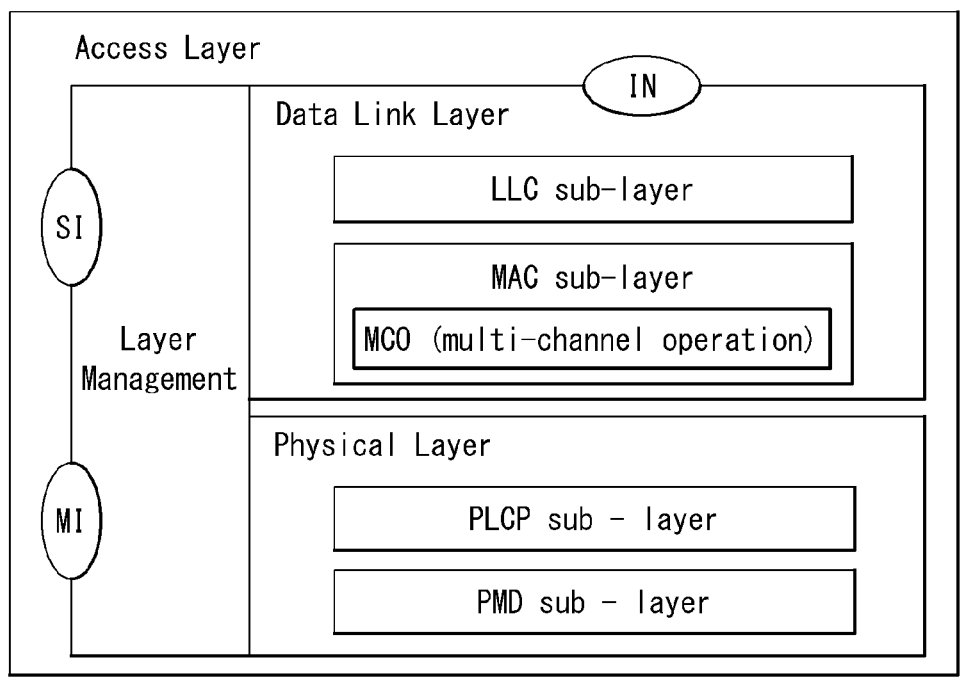

[Figure 3]
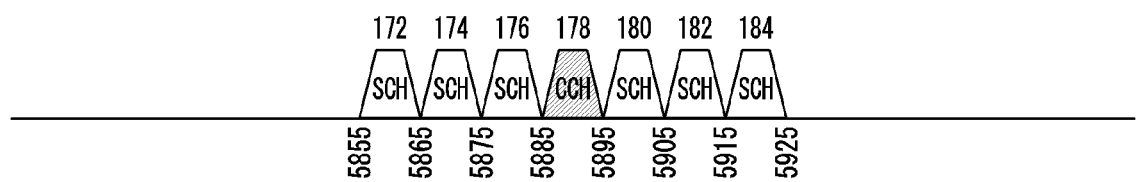
(a)
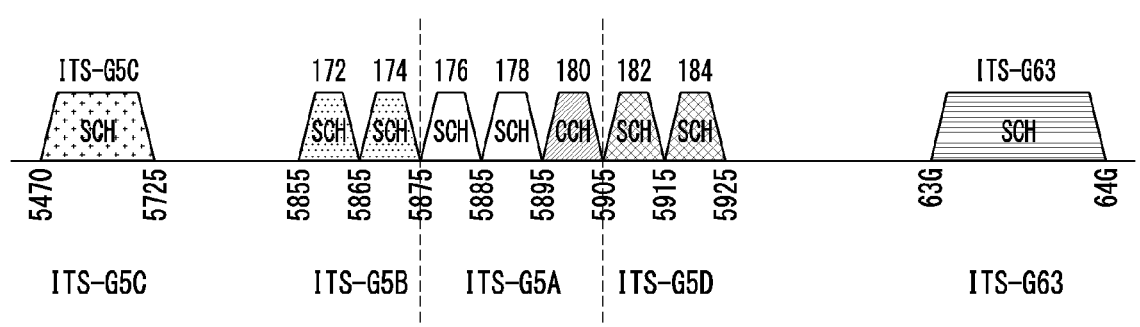
(b)

[Figure 4]
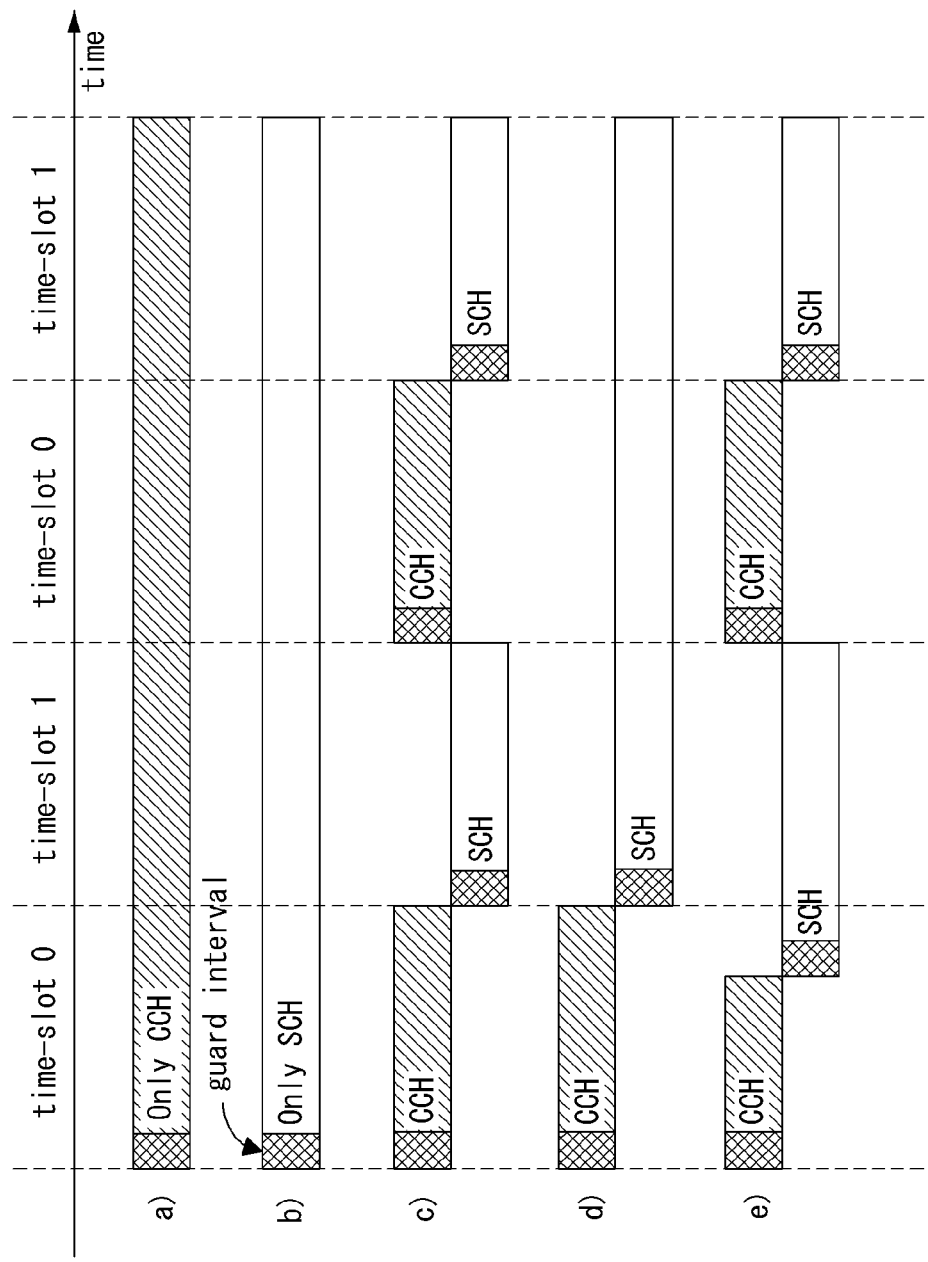

【Figure5】

| LM NPDU | | | | | | | | | | |
|---|---|---|---|---|---|---|---|---|---|---|
| N-Header | | | | | T-Header | | | | | Body |
| 4bits | 1bit | 3bits | Variables | Variable | 7bits | 1bit | Variables | Variable | 1..2 octets | Variable |
| Subtype | N-Extensions flag | Version | Depends on subtype | N-Extensions | TPID / Feature selector | T-Extensions flag | Depends on TPID | T-Extensions | Length of User Data | User Data |

[Figure 6]

| SAM | | | | | | | |
|---|---|---|---|---|---|---|---|
| Header | | | | Body | | | |
| 4bits | 4bits | 4bits | 4bits | Optional Variable | Optional Variable | Optional Variable | Optional Variable |
| Version | Option selector | SAM-ID | SAM Count | SAM Extensions | Service Info Segment | Chanel Info Segment | IPv6 Routing Advertisement |

[Figure 7]
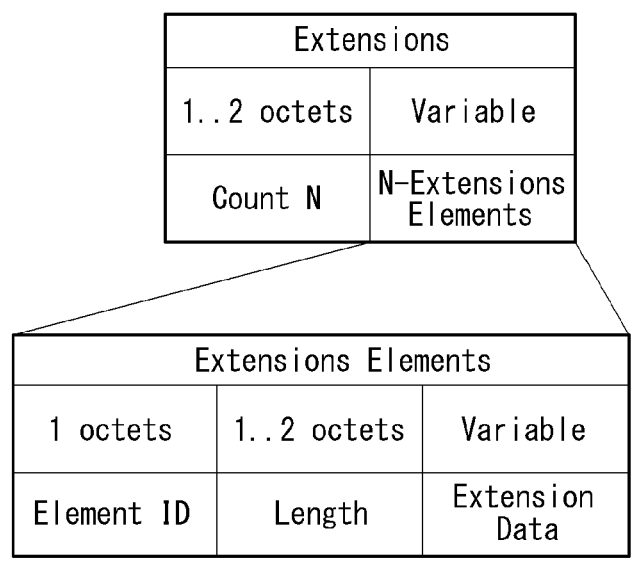

【Figure8】

| Name | ASN.1 type | Element ID value | Usage |
|---|---|---|---|
| | | 0-3 | Reserved for IEEE |
| Transmit Power Used | TXpower80211 | 4 | LM N-Extensions |
| 2D Location | TwoDLocation | 5 | SAM Header |
| 3D Location | ThreeDLocation | 6 | SAM Header |
| Advertiser Identifier | AdvertiserIdentifier | 7 | SAM Header |
| Provider Service Context | ProviderServiceContext | 8 | SAM Service Info |
| IPv6 Address | IPv6Address | 9 | SAM Service Info |
| Service Port | ServicePort | 10 | SAM Service Info |
| Provider MAC Address | ProviderMacAddress | 11 | SAM Service Info |
| EDCA Parameter Set | EdcaParameterSet | 12 | SAM Channel Info |
| Secondary DNS | SecondaryDns | 13 | SAM Routing Advertisement |
| Gateway MAC Address | GatewayMacAddress | 14 | SAM Routing Advertisement |
| Channel Number | ChannelNumber80211 | 15 | LM N-Extensions |
| Data Rate | DataRate80211 | 16 | LM N-Extensions |
| Repeat Rate | RepeatRate | 17 | SAM Header |
| | | 18 | Reserved for IEEE |
| RCPI Threshold | RcpiThreshold | 19 | SAM Service Info |
| WSA Count Threshold | WsaCountThreshold | 20 | SAM Service Info |
| Channel Access | ChannelAccess80211 | 21 | SAM Channel Info |
| WSA Count Threshold Interval | WsaCountThresholdInterval | 22 | SAM Service Info |
| Channel Load | not yet specified | 23 | LM N-Extensions |
| | | 24-79 | Reserved for IEEE |
| LM TX CIP | TXcip | 80 | LM N-Extensions |
| LM RX CIP | RXcip | 81 | LM N-Extensions |
| Channel Busy Ratio | LMchannelBusyRatio | 82 | LM N-Extensions |
| Packet ID | LMpacketID | 83 | LM T-Extensions |
| Extended Channel Infos | ExtendedChannelInfos | 84 | SAM Header |
| SAM Application Data | SAMapplicationData | 85 | SAM Service Info |
| | | 86-120 | Reserved for ISO |
| | | 121-255 | Reserved for IEEE |

[Figure 9]

| Service Info Segment | | | | | | |
|---|---|---|---|---|---|---|
| Variable | Variable | 5 bits | 3 bits | Optional Variable | Optional Variable | Optional Variable |
| Count N | ITS-AID | Channel Index | Option Selectors | System Service | Reply Port Number | Service Info Extensions |

[Figure 10]

| Name | ASN.1 type | Element ID value | Usage |
|---|---|---|---|
| Provider Service Context | ProviderServiceContext | 8 | SAM Service Info |
| IPv6 Address | IPv6Address | 9 | SAM Service Info |
| Service Port | ServicePort | 10 | SAM Service Info |
| Provider MAC Address | ProviderMacAddress | 11 | SAM Service Info |
| RCPI Threshold | RcpiThreshold | 19 | SAM Service Info |
| WSA Count Threshold | WsaCountThreshold | 20 | SAM Service Info |
| WSA Count Threshold Interval | WsaCountThresholdInterval | 22 | SAM Service Info |
| SAM Application Data | SAMapplicationData | 85 | SAM Service Info |

[Figure 11]

| Channel Info Segment | | | | | | | |
|---|---|---|---|---|---|---|---|
| Variable | 1 octet | 1 octet | 1 octet | 1 bit | 7 bits | 1 octet | Optional Variable |
| Count N | Operating Class | Channel Number | Transmit Power Level | Adaptable | Data Rate | Option Selector | Channel info Extensions |

Repeated N times

【Figure 12】
| IPv6 Routing Advertisement | | | | | |
|---|---|---|---|---|---|
| 2 octets | 16 octets | 1 octet | 16 octets | 16 octets | Variable |
| Router Lifetime | IPv6 Prefix | IPv6 Prefix Length | Default Gateway | Primary DNS | IPv6 Routing Extensions |
【Figure13】
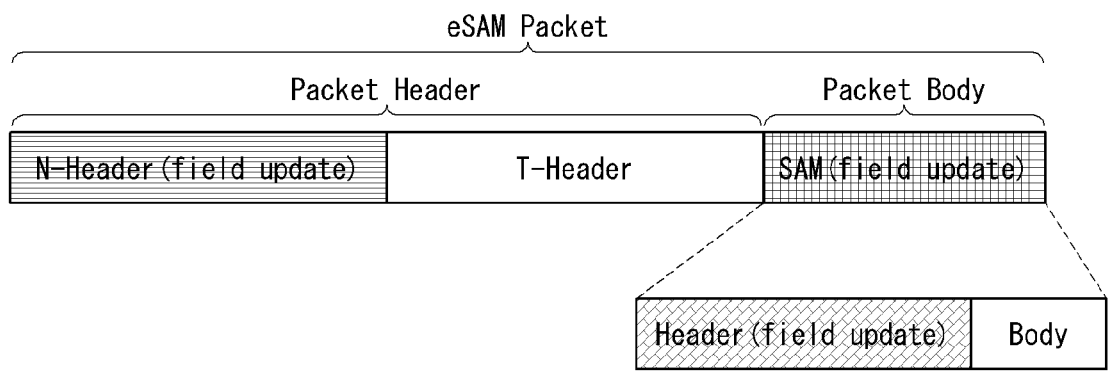

【Figure 14】

| LM NPDU | | | | | | | | | | |
|---|---|---|---|---|---|---|---|---|---|---|
| N-Header | | | | | T-Header | | | | | Body |
| 4 bits | 1 bit | 3 bits | Variables | Variable | 7 bits | 1 bit | Variables | Variable | 1..2 octets | Variable |
| Subtype | N-Extensions flag | Version | Depends on subtype | N-Extensions | TPID | | Depends on TPID | T-Extensions | Length of User Data | User Data |
| | | | | | Feature selector | N-Extensions flag | | | | |

| Name | ASN.1 type | Element ID value | Usage |
|---|---|---|---|
| Transmit Power Used | TXpower80211 | 4 | LM N-Extensions |
| Channel Number | ChannelNumber80211 | 15 | LM N-Extensions |
| Data Rate | DataRate80211 | 16 | LM N-Extensions |
| LM TX CIP | TXcip | 80 | LM N-Extensions |
| LM RX CIP | RXcip | 81 | LM N-Extensions |
| Channel Busy Ratio | LMchannelBusyRatio | 82 | LM N-Extensions |

[Figure 15]

| LM NPDU | | | | | | | | | | |
|---|---|---|---|---|---|---|---|---|---|---|
| N-Header | | | | | T-Header | | | | | Body |
| 4 bits | 1 bit | 3 bits | Variables | Variable | 7 bits | 1 bit | Variables | Variable | 1..2 octets | Variable |
| Subtype | N-Extensions flag | Version | Depends on subtype | N-Extensions | TPID | | Depends on TPID | T-Extensions | Length of User Data | User Data |
| | | | | | Feature selector | N-Extensions flag | | | | |

| Name | ASN.1 type | Element ID value | Usage |
|---|---|---|---|
| Transmit Power Used | TXpower80211 | 4 | LM N-Extensions |
| Channel Number | ChannelNumber80211 | 15 | LM N-Extensions |
| Data Rate | DataRate80211 | 16 | LM N-Extensions |
| LM TX CIP | TXcip | 80 | LM N-Extensions |
| LM RX CIP | RXcip | 81 | LM N-Extensions |
| Channel Busy Ratio | LMchannelBusyRatio | 82 | LM N-Extensions |
| Additional Channel Busy Ratio | AddiLMchannelBusyRatio | x | LM N-Extensions |

[Figure 16]

| LM NPDU ||||||||||| |
|---|---|---|---|---|---|---|---|---|---|---|
| N-Header |||||| T-Header |||| Body |
| 4 bits | 1 bit | 3 bits | Variables | Variable | 7 bits | 1 bit | Variables | Variable | 1..2 octets | Variable |
| Subtype | N-Extensions flag | Version | Depends on subtype | N-Extensions | TPID || Depends on TPID | T-Extensions | Length of User Data | User Data |
| | | | | | Feature selector | N-Extensions flag | | | | |

| Name | ASN.1 type | Element ID value | Usage |
|---|---|---|---|
| Transmit Power Used | TXpower80211 | 4 | LM N-Extensions |
| Channel Number | ChannelNumber80211 | 15 | LM N-Extensions |
| Data Rate | DataRate80211 | 16 | LM N-Extensions |
| LM TX CIP | TXcip | 80 | LM N-Extensions |
| LM RX CIP | RXcip | 81 | LM N-Extensions |
| Channel Busy Ratio | LMchannelBusyRatio | 82 | LM N-Extensions |
| Additional Channel Busy Ratio | AddiLMchannelBusyRatio | x | LM N-Extensions |
| Multichannel Access Mode | MultichannelAccessMode | x | LM N-Extensions |
| Multichannel Access Interval(default) | Multichannel Access Interval | x | LM N-Extensions |

【Figure17】
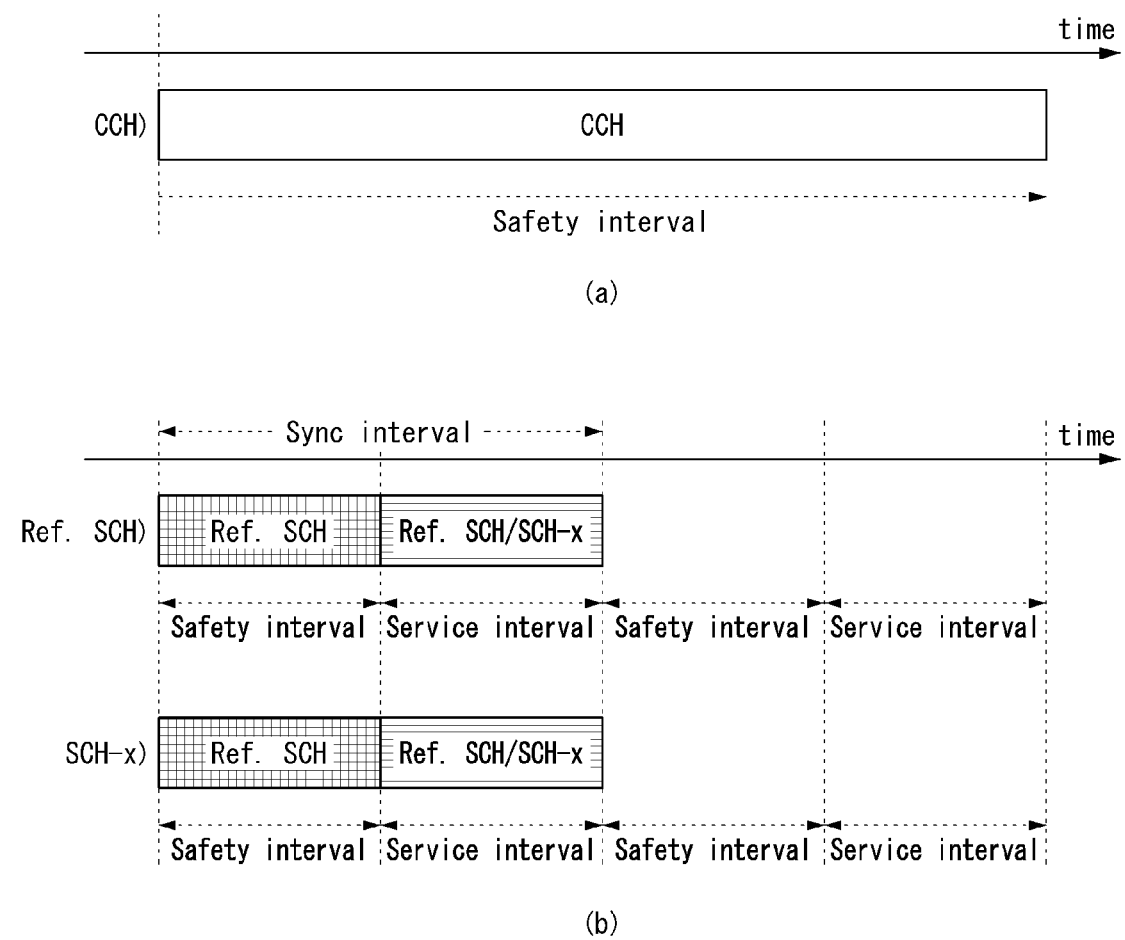

【Figure 18】
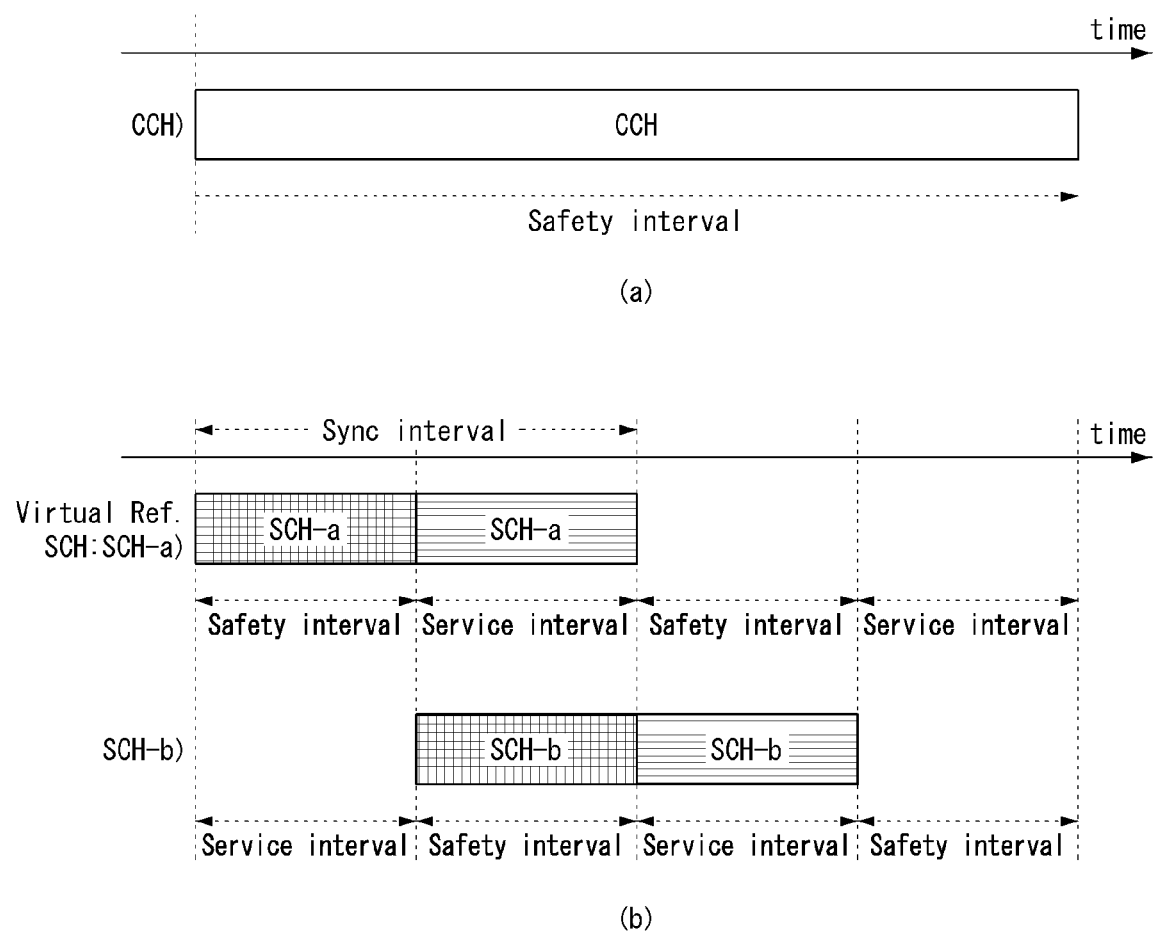

[Figure 19]
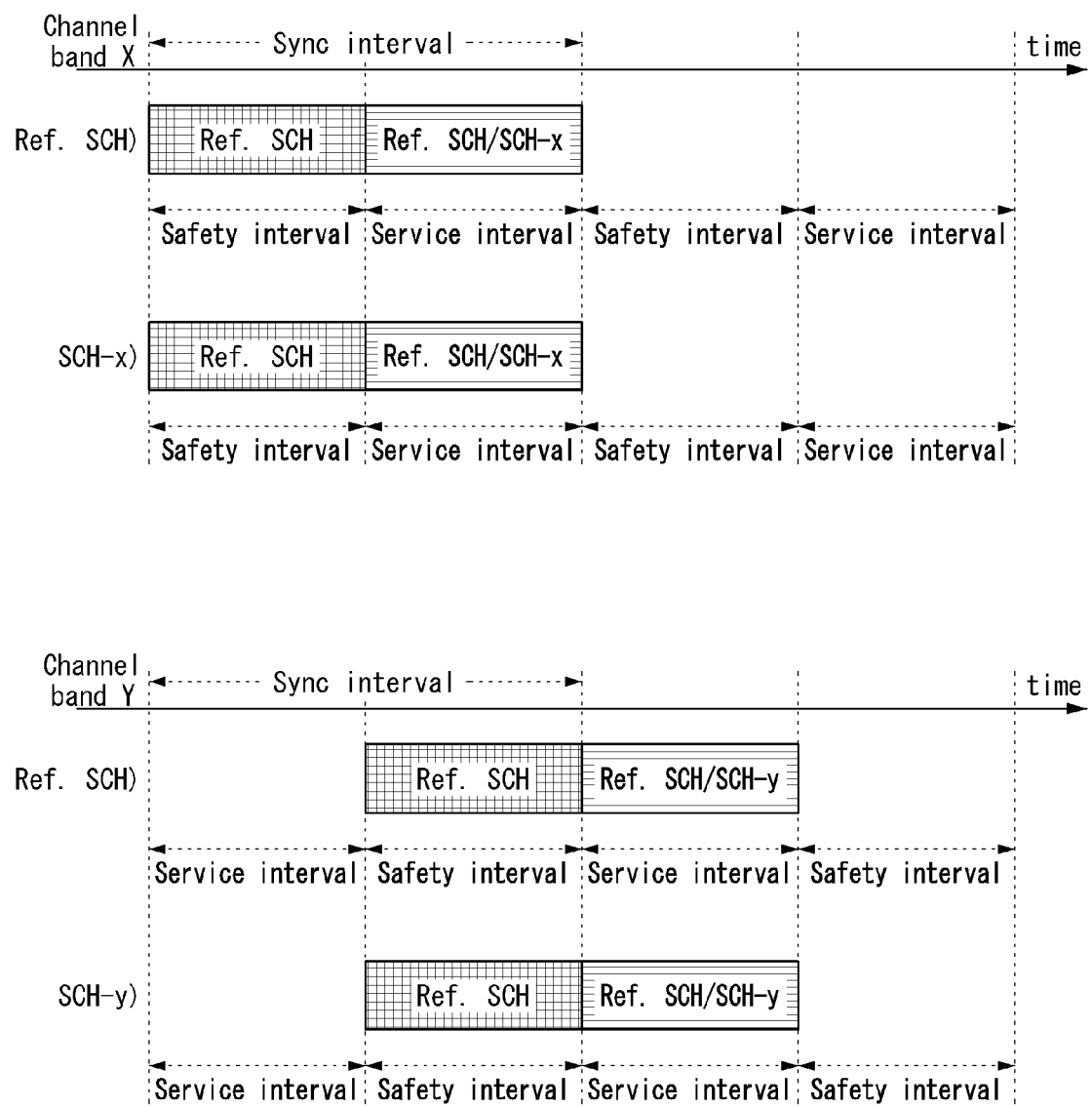

[Figure 20]
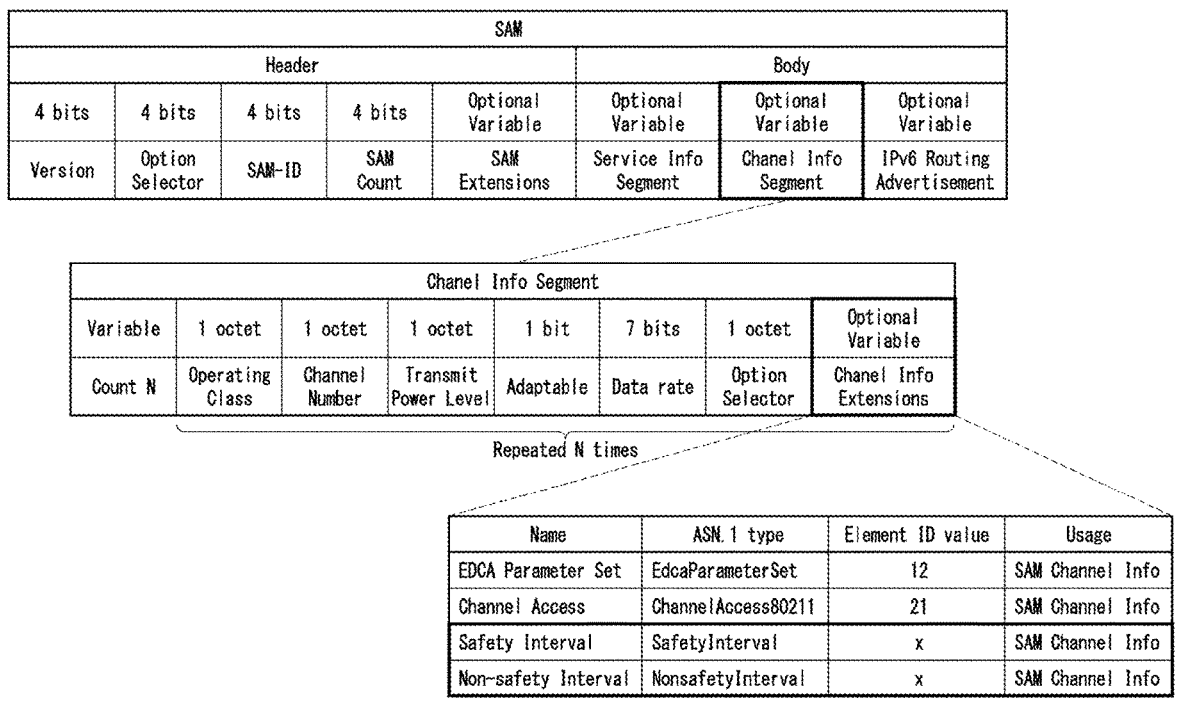

[Figure 21]
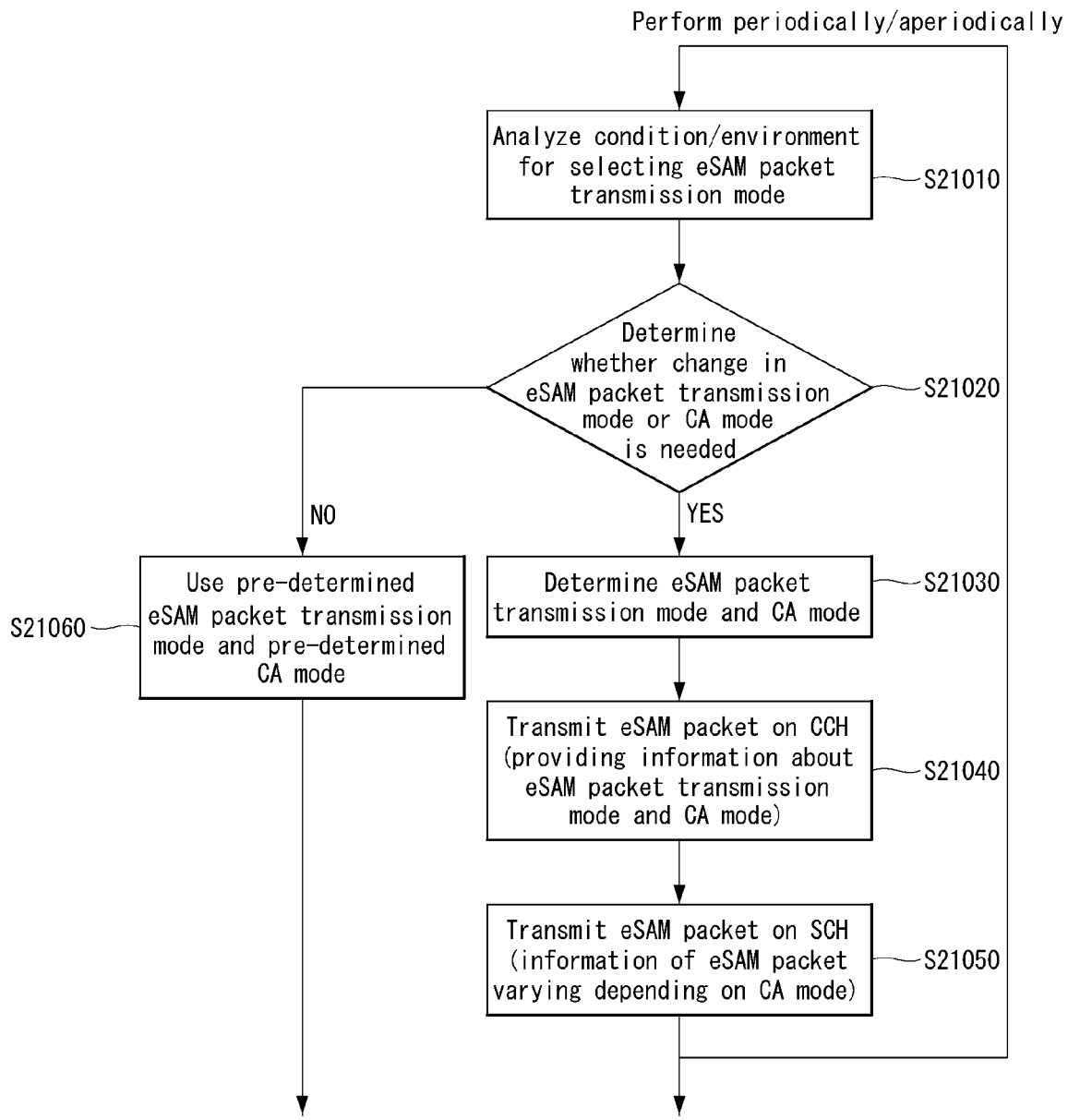

[Figure 22]
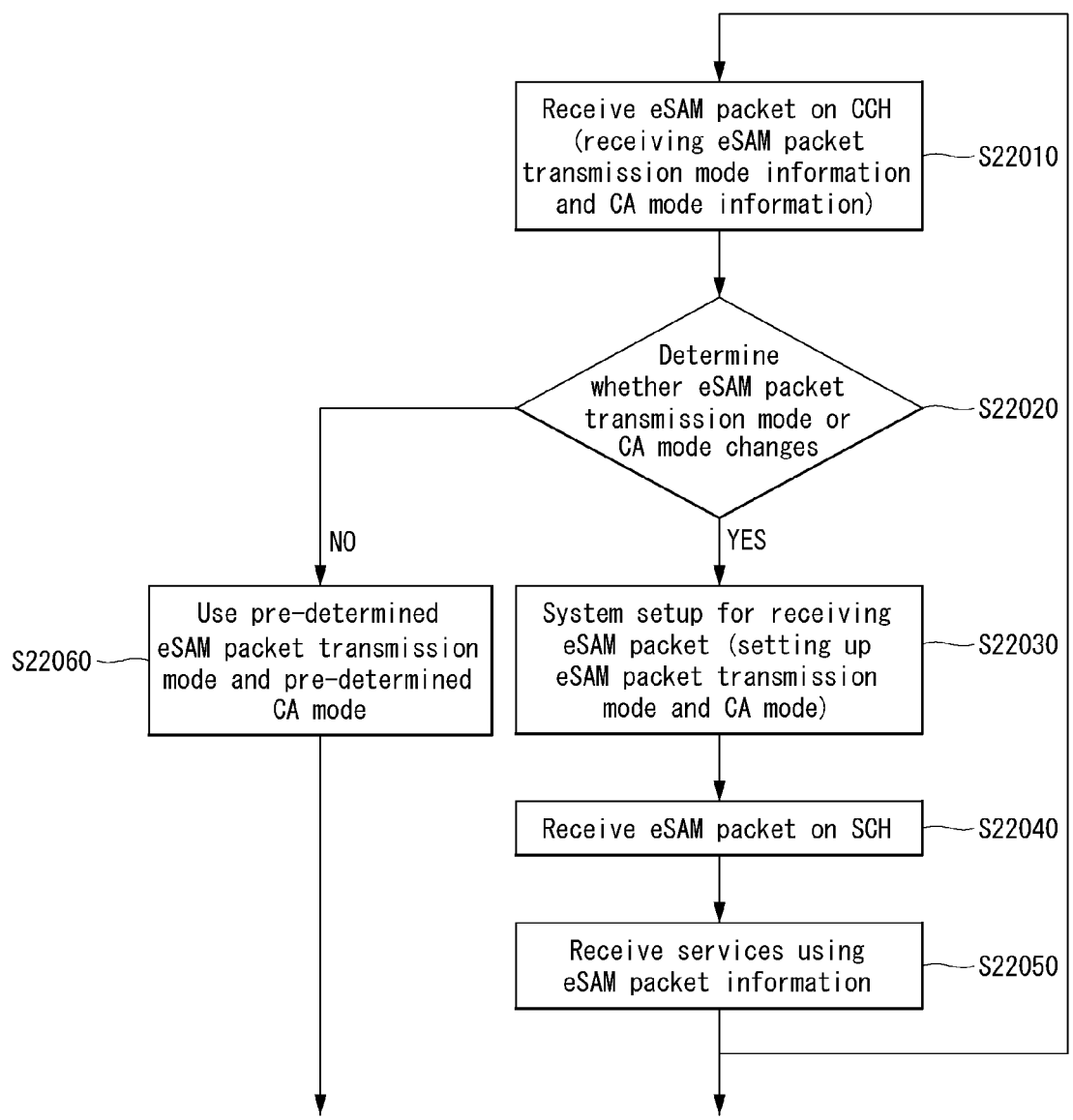

[Figure 23]

| | | | LM NPDU | | | | | |
|---|---|---|---|---|---|---|---|---|
| N-Header | | | | T-Header | | | | Body |
| 4 bits | 1 bit | 3 bits | Variables | Variable | 7 bits | 1 bit | Variables | Variable | 1..2 octets | Variable |
| | | | | | TPID | | | | |
| Subtype | N-Extensions flag | Version | Depends on subtype | N-Extensions | Feature selector | N-Extensions flag | Depends on TPID | T-Extensions | Length of User Data | User Data |

| Name | ASN.1 type | Element ID value | Usage |
|---|---|---|---|
| Transmit Power Used | TXpower80211 | 4 | LM N-Extensions |
| Channel Number | ChannelNumber80211 | 15 | LM N-Extensions |
| Data Rate | DataRate80211 | 16 | LM N-Extensions |
| LM TX CIP | TXcip | 80 | LM N-Extensions |
| LM RX CIP | RXcip | 81 | LM N-Extensions |
| Channel Busy Ratio | LMchannelBusyRatio | 82 | LM N-Extensions |
| Additional Channel Busy Ratio | AddiLMchannelBusyRatio | x | LM N-Extensions |
| Multichannel Access Mode | MultichannelAccessMode | x | LM N-Extensions |
| Multichannel Access Interval (default) | MultichannelAccessInterval | x | LM N-Extensions |
| SAM Transmission Mode | SAMTransmissionMode | x | LM N-Extensions |
| SAM SCH Number | SAMSCHNumber | x | LM N-Extensions |

[Figure 24]
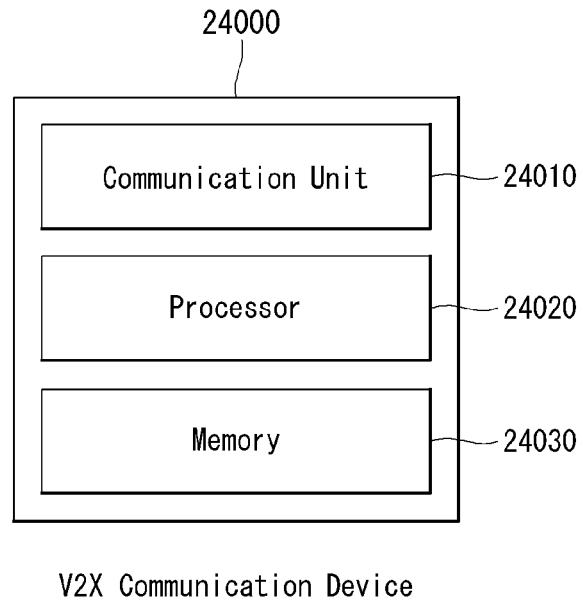
V2X Communication Device
[Figure 25]
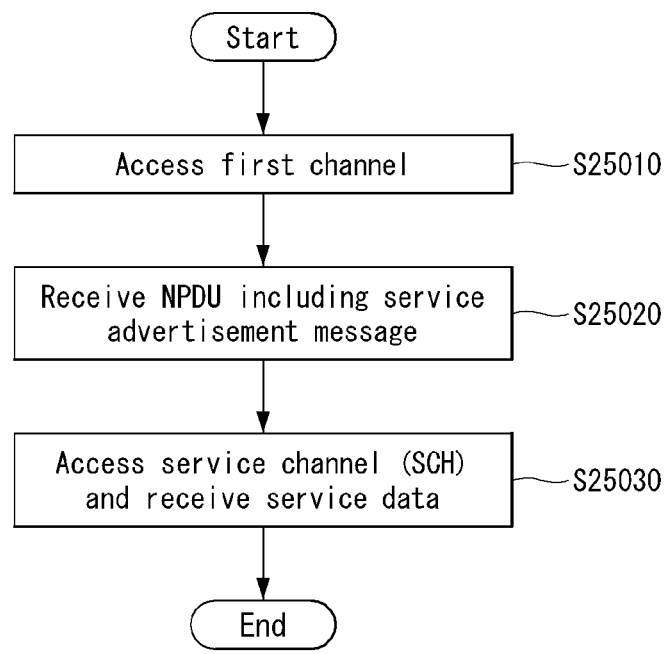

V2X COMMUNICATION DEVICE AND COMMUNICATION METHOD THEREOF

This application is the National Stage filing under 35 U.S.C. 371 of International Application No. PCT/KR2017/014752, filed on Dec. 14, 2017, the contents of which is hereby incorporated by reference herein in its entirety.

TECHNICAL FIELD

The present disclosure relates to a device for V2X communication and a communication method thereof, and more particularly to configuration of a service advertisement message for receiving services through V2X communication.

BACKGROUND ART

The present disclosure relates to a V2X communication device and a communication method thereof and, more particularly, to a communication method of a hybrid V2X communication device performing communication based on a WLAN V2X communication protocol and a cellular V2X communication protocol.

DISCLOSURE

Technical Problem

Various services can be provided through V2X communication. Furthermore, a plurality of frequency bands was used to provide the various services. Even in such an environment, highly reliable forwarding and providing of safety services are very important matters considering characteristics of vehicle communication.

A service advertisement message is sent to provide services through the V2X communication. As the V2X communication environment develops, it is necessary to improve and reinforce the service advertisement message.

Technical Solution

In order to solve the above-described and other problems, in one aspect, there is provided a communication method of a V2X communication device comprising accessing a first channel; receiving a network protocol data unit (NPDU) including a service advertisement message (SAM) on the first channel; and based on the service advertisement message, accessing a service channel and receiving service data, wherein the NPDU includes a N-header, a T-header, and a body, wherein the N-header provides network related information, the T-header provides transport related information, and the body includes the service advertisement message, wherein the service advertisement message provides service information and information about the service channel on which a service is provided.

The service advertisement message may include a header part and a body part. The header part may include at least one of SAM ID information, SAM count information, and SAM extension information, and the body part may include service information and channel information.

The N-header may include channel busy ratio (CBR) information on the first channel and additional CBR information on an additional channel, and the CBR information may indicate a percentage of channel usage for a specific channel.

The N-header may include at least one of multichannel access mode information and multichannel access interval information.

The multichannel access mode information may indicate at least one of an asynchronous multichannel access mode, an overlapping multichannel access mode, a sequential multichannel access mode, or a mixed multichannel access mode.

The N-header may include at least one of transmission mode information of the service advertisement message and service channel number information on which the service advertisement message is transmitted.

The transmission mode information of the service advertisement message may indicate at least one of a first mode in which the service advertisement message is transmitted on a control channel, a second mode in which the service advertisement message is transmitted on one reference service channel, a third mode in which the service advertisement message is transmitted on all of SCHs, or a fourth mode in which channels are divided into a plurality of sub-bands, and the service advertisement message is transmitted on one reference service channel in the divided sub-band.

In another aspect, there is provided a V2X communication device comprising a memory configured to store data; a communication unit configured to transmit and receive a radio signal; and a processor configured to control the memory and the communication unit, wherein the V2X communication device is configured to access a first channel, receive a network protocol data unit (NPDU) including a service advertisement message (SAM) on the first channel, and based on the service advertisement message, access a service channel and receive service data, wherein the NPDU includes a N-header, a T-header, and a body, wherein the N-header provides network related information, the T-header provides transport related information, and the body includes the service advertisement message, wherein the service advertisement message provides service information and information about the service channel on which a service is provided.

Advantageous Effects

The present disclosure can help V2X devices to select channel when accessing a multichannel by providing CBR information on an additional channel by a NPDU including a service advertisement message. Further, the V2X device provides/receives services with reference to CBR information on a plurality of channels, and thus can distribute traffic concentration for a specific channel and improve resource usage efficiency. The present disclosure can allow the V2X device to flexibly change a multichannel access mode by transmitting multichannel access mode information. The present disclosure supports various transmission modes and enables a flexible operation of the V2X device by transmitting transmission mode information of the service advertisement message.

DESCRIPTION OF DRAWINGS

The accompanying drawings, which are included herein as a part of the description to help understanding the present disclosure, provide embodiments of the present disclosure and describe the technical features of the present disclosure with the description below.

FIG. 1 illustrates reference architecture of an intelligent transport system (ITS) station according to an embodiment of the present disclosure.

FIG. 2 illustrates an ITS access layer according to an embodiment of the present disclosure.

FIG. 3 illustrates multi-channel allocation used for an ITS system operation according to an embodiment of the present disclosure.

FIG. 4 illustrates a channel coordination mode of multi-channel operation according to an embodiment of the present disclosure.

FIG. 5 illustrates a structure of an LM NPDU according to an embodiment of the present disclosure.

FIG. 6 illustrates a structure of an SAM according to an embodiment of the present disclosure.

FIG. 7 illustrates a structure of an SAM Extensions field according to an embodiment of the present disclosure.

FIG. 8 illustrates Extensions elements and element IDs according to an embodiment of the present disclosure.

FIG. 9 illustrates a structure of a Service Info Segment of an SAM according to an embodiment of the present disclosure.

FIG. 10 illustrates Extensions elements used in a Service Info Segment according to an embodiment of the present disclosure.

FIG. 11 illustrates a structure of a Channel Info Segment of an SAM according to an embodiment of the present disclosure.

FIG. 12 illustrates a structure of IPv6 Routing Advertisement information of an SAM according to an embodiment of the present disclosure.

FIG. 13 illustrates configuration of an eSAM packet according to an embodiment of the present disclosure.

FIG. 14 illustrates a CBR information signalling method according to an embodiment of the present disclosure.

FIG. 15 illustrates a CBR information signalling method according to another embodiment of the present disclosure.

FIG. 16 illustrates a channel access mode signalling method according to an embodiment of the present disclosure.

FIG. 17 illustrates an ETSI MA mode according to an embodiment of the present disclosure.

FIG. 18 illustrates a sequential multichannel access mode according to an embodiment of the present disclosure.

FIG. 19 illustrates a mixed CA operation method according to an embodiment of the present disclosure.

FIG. 20 illustrates a channel access mode signalling method according to another embodiment of the present disclosure.

FIG. 21 illustrates an eSAM packet transmission method according to an embodiment of the present disclosure.

FIG. 22 illustrates an eSAM packet reception method according to another embodiment of the present disclosure.

FIG. 23 illustrates a signalling method of an eSAM packet transmission mode according to an embodiment of the present disclosure.

FIG. 24 illustrates a V2X communication device according to an embodiment of the present disclosure.

FIG. 25 is a flow chart illustrating a communication method of a hybrid V2X communication device according to an embodiment of the present disclosure.

BEST MODE

Preferred embodiments of the disclosure will be described in detail with reference to the accompanying drawings. The following detailed description with reference to the attached drawings illustrates preferred embodiments of the disclosure rather than illustrating only embodiments that may be implemented according to embodiments of the disclosure. The following detailed description includes details in order to provide a thorough understanding of the disclosure, but the disclosure does not require all of these details. In the disclosure, embodiments described hereinafter are not intended to be respectively used independently. Multiple embodiments or all embodiments may be used together, and specific embodiments may be used in combination.

Most of terms used in the disclosure are selected from general ones widely used in the art, but some terms are optionally selected by an applicant and meanings thereof are described in detail in the following description as needed. Accordingly, the disclosure should be understood based on the intended meaning of the term rather than a simple name or meaning of the term.

The disclosure relates to a V2X communication device, and the V2X communication device may be included in an Intelligent Transport System (ITS) to perform all or some of functions of the ITS system. The V2X communication device may perform communication with a vehicle and a vehicle, a vehicle and an infrastructure, a vehicle and a bicycle, and mobile devices. The V2X communication device may be abbreviated to a V2X device. In an embodiment, the V2X device may correspond to an On Board Unit (OBU) of a vehicle or may be included in an OBU. The V2X device may correspond to a Road Side Unit (RSU) of an infrastructure or may be included in an RSU. Alternatively, the V2X communication device may correspond to an ITS station or may be included in an ITS station. In an embodiment, the V2X device may operate in a Wireless Access In Vehicular Environments (WAVE) system of IEEE 1609.1 to 4.

FIG. 1 illustrates reference architecture of an Intelligent Transport System (ITS) station according to an embodiment of the disclosure.

In the architecture of FIG. 1, two end vehicles/users may communicate with a communication network, and such communication may be performed through a function of each layer of the architecture of FIG. 1. For example, when a message between vehicles is communicated, in a transmitting vehicle and an ITS system thereof, by passing through each layer below one layer, data may be transferred, and in a receiving vehicle and an ITS system thereof, by passing through each layer above one layer, data may be transferred. A description of each layer of the architecture of FIG. 1 is as follows.

Application layer: the application layer may implement and support various use cases. For example, the application may provide road safety, efficient traffic information, and other application information.

Facilities layers: the facilities layer may support to effectively realize various use cases defined at the application layer. For example, the facilities layer may perform application support, information support, and session/communication support.

Networking & Transport layer: the networking/transport layer may constitute a network for vehicle communication between homogenous/heterogenous networks by using various transport protocols and network protocols. For example, the networking/transport layer may provide Internet access and routing using an Internet protocol such as TCP/UDP+IPv6. Alternatively, the networking/transport layer may constitute a vehicle network using a geographical position based protocol such as Basic Transport Protocol (BTP)/GeoNetworking.

Access layer: the access layer may transmit a message/data received from a superordinate layer through a physical channel For example, the access layer may perform/support data communication based on IEEE 802.11 and/or 802.11p standard based communication technology, ITS-G5 wireless communication technology based on IEEE 802.11 and/or 802.11p standard physical transmission technology, 2G/3G/4G(LTE)/5G wireless cellular communication technology including satellite/broadband wireless mobile communication, broadband terrestrial digital broadcasting technology such as DVB-T/T2/ATSC, GPS technology, and IEEE 1609 WAVE technology.

ITS architecture may further include a management layer and a security layer.

FIG. 2 illustrates an ITS access layer according to an embodiment of the disclosure.

FIG. 2 illustrates in more detail the ITS Access Layer of the ITS system of FIG. 1. The access layer of FIG. 2 may include a data link layer, a physical layer, and layer management. The access layer of FIG. 2 has characteristics similar to or identical to an OSI 1 layer (physical layer) and an OSI 2 layer (data link layer).

The data link layer may include a Logical Link Control (LLC) sub-layer, a Medium Access Control (MAC) sub-layer, and a Multi-channel operation (MCO) sub-layer. The physical layer may include a Physical Layer Convergence Protocol (PLCP) sub-layer and a Physical Medium Access (PMD) sub-layer.

In order to enable a superordinate network layer to use a physical line between adjacent nodes (or between vehicles) having noise, the data link layer may convert the physical line into a communication channel having no transmission error. The data link layer performs a function of transmitting/transporting/transferring a 3-layer protocol, a framing function of dividing and grouping data to transmit into a packet (or frame) as a transmission unit, a flow control function of compensating a speed difference between the sending side and the receiving side, and a function of detecting and modifying or retransmitting a transmission error. Further, the data link layer performs a function of giving a sequence number to a packet and an ACK signal in order to avoid to erroneously confuse the packet or the ACK signal and a function of controlling setting, maintaining, short-circuit, and data transmission of a data link between network entities. Furthermore, such a data link layer may include a logical link control (LLC) sub-layer and a medium access control (MAC) sub-layer based on IEEE 802 standard.

A main function of the LLC sub-layer is to enable to use several different sub-MAC sub-layer protocols to allow communication unrelated to topology of a network.

The MAC sub-layer may control occurrence of collision/contention between vehicles when several vehicles (or nodes or a vehicle and peripheral devices) use a shared medium. The MAC sub-layer may format a packet transferred from a superordinate layer to correspond to a frame format of the physical network. The MAC sub-layer may perform addition and identification functions of a sender address/recipient address, carrier detection, collision detection, and fault detection on a physical medium.

The physical layer: the physical layer may define an interface between a node and a transmission medium to a lowest layer on an ITS layer structure and perform modulation, coding, and mapping of a transmission channel to a physical channel for bit transmission between data link layer entities. Further, the physical layer performs a function of notifying the MAC sub-layer whether a wireless medium is being used (busy or idle) through carrier sense and clear channel assessment (CCA). Furthermore, such a physical layer may include a physical layer convergence protocol (PLCP) sub-layer and a physical medium access (PMD) sub-layer based on IEEE standard.

The PLCP sub-layer performs a function of connecting a data frame with the MAC sub-layer. By attaching a header to the received data, the PLCP sub-layer enables to operate the MAC sub-layer regardless of physical characteristics. Therefore, in the PLCP frame, a format thereof may be defined differently according to various different wireless LAN physical layer standards.

A main function of the PMD sub-layer may perform carrier/RF modulation of frames received from the PLCP sub-layer and then transmit the frames to a wireless medium according to transmission and reception transmission related standards.

Layer management performs a function of managing and servicing information related to an operation and security of an access layer. Information and service are bilaterally transferred and shared through MI (interface between management entity and access layer or MI-SAP) and SI (interface between security entity and access layer or SI-SAP). Two-way information and service transfer between the access layer and a network/transport layer is performed by IN (or IN-SAP).

The MCO sub-layer may provide various services such as a safety service and other services, i.e., a non-safety service other than the safety service using a plurality of frequency channels. By effectively distributing a traffic load in a particular frequency channel to other channels, the MCO sub-layer may minimize collision/contention when communicating between vehicles in each frequency channel. The MCO sub-layer may perform multi-channel access and operation to be described hereinafter based on setting received from the superordinate layer.

FIG. 3 illustrates multi-channel allocation used for an ITS system operation according to an embodiment of the disclosure.

FIG. 3(a) illustrates US spectrum allocation for an ITS, and FIG. 3(b) illustrates EP spectrum allocation for an ITS.

As shown in FIG. 3, the United States and Europe have seven frequencies (each frequency bandwidth: 10 MHz) in 5.9 GHz band (5.855 to 5.925 GHz). Seven frequencies may include one CCH and 6 SCHs. As shown in FIG. 3(a), in the United States, the CCH is allocated to a channel number 178 and as shown in FIG. 3(b), in European, the CCH is allocated to a channel number 180.

In Europe, in order to provide a service that is time-sensitive and having a large data capacity, it is considered to additionally use an ITS-G63 band in a superordinate frequency band based on 5.9 GHz and it is considered to use an ITS-G5 band in a subordinate frequency band. In order to provide a high quality of service by appropriately allocating the service to various multi-channels in such an environment, development of an efficient multi-channel operation method is required.

The CCH indicates a radio channel used for exchange of a management frame and/or a WAVE message. The WAVE message may be a WAVE short message (WSM). The SCH is a radio channel used for providing a service and represents a random channel instead of the CCH. In an embodiment, the CCH may be used for communication of a Wave Short Message Protocol (WSMP) message or communication of a system management message such as a WAVE Service Advertisement (WSA). The SCH may be used for general-purpose application data communication, and communication of such general-purpose application data may be coordinated by service related information such as the WSA.

Hereinafter, the WSA may be also referred to as service advertisement information. The WSA is an application may provide information including announcement of availability of an application-service. A WSA message may identify and describe an application service and a channel in which the service is accessible. In an embodiment, the WSA may include a header, service information, channel information, and WAVE routing advertisement information.

Service advertisement information for service access may be a periodic message. In an embodiment, Co-operative Awareness Messages (CAM) may be periodic messages. The CAM may be broadcasted periodically by a facilities layer. In an embodiment, the CAM may also be transmitted by the RSU, and in such a case, the CAM may be transmitted and received in an RSU interval hereinafter.

Decentralized Environmental Notification Messages (DENM) may be event messages. The event message may be triggered by detection of the event to be transmitted. Service messages may be transmitted to manage a session. In the following embodiments, the event message may include a security message/information. The service message may include a non-safety mess age/information.

A V2X communication device may broadcast a cooperative awareness message (CAM) or a decentralized environmental notification message (DENM).

The CAM is distributed in an ITS network, and provides information for at least one of the presence, location or communication state of an ITS station. The DENM provides information for a detected event. The DENM may provide information for a given driving situation or event detected by an ITS station. For example, the DENM may provide information for a situation, such as an emergency electronic brake lamp, a traffic accident, a vehicle problem, or a traffic condition.

FIG. 4 illustrates a channel coordination mode of multi-channel operation according to an embodiment of the present disclosure.

FIG. 4 illustrates one of channel coordination modes of multi-channel operation: (a), (b) continuous mode, (c) altering mode, (d) extended mode, and (e) immediate mode. The channel coordination mode may indicate a method for accessing a CCH and an SCH by a V2X device.

A V2X device may access at least one channel As an embodiment, a single-radio device may monitor a CCH and exchange data via an SCH. To this purpose, a channel interval has to be specified, where FIG. 4 illustrates the channel interval, namely, time slot allocation. Radio channel altering may be operated based on an interval synchronized in association with a common time base. A sync interval may include a plurality of time slots. And a plurality of time slots may correspond to a CCH interval and an SCH interval. In this case, a sync interval may include a CCH interval and an SCH interval. During the CCH interval, traffic may be exchanged via the CCH. A single-radio device participating in an application service may switch to the SCH during the SCH interval. Each of the CCH interval and the SCH interval may include a guard interval. Each interval may start as a guard interval.

As an embodiment, exchange of multi-channel operation information and safety-related service information may be performed via the CCH during the CCH interval. Also, negotiation for exchange of information between a service provider and a user may be performed via the CCH during the CCH interval. A hardware timing operation for channel altering of the V2X device may be initiated by a sync signal obtained from Coordinated Universal Time (UTC)-based estimation. Channel synchronization may be performed at 1 Pulse Per Second (PPS) intervals based on the UTC.

As an embodiment, FIG. 4 illustrates a channel coordination method of Multi-Channel Operation (MCO) described in the IEEE 1609.4, where two MAC layers perform time division on one physical layer to use a CCH and the respective channel modes in an alternate manner.

(a) & (b) Continuous mode: In the continuous mode, each vehicle or all the vehicles operate independently of a time division reference such as the time slot/CCH interval/SCH interval of FIG. 4. In the continuous mode, a V2X device may continuously receive operation information and safety-related service information of multi-channels from a specified CCH or SCH or may perform exchange of information between a service provider and a user.

(c) Altering mode: In the altering mode, each vehicle or all the vehicles may receive operation information and safety-related service/information of multi-channels or may perform a negotiation process for information exchange between a service provider and a user during the CCH interval. In the altering mode, each vehicle of all the vehicles perform service/information exchange between the service provider and the user during the SCH interval. In the altering mode, a V2X device may perform communication via the CCH and the SCH in an alternate manner during configured CCH and SCH intervals.

(d) Extended mode: In the extended mode, communication during the CCH interval and the SCH interval may be performed as in the altering mode. However, service/information exchange during the SCH interval may also be performed during the CCH interval. As an embodiment, a V2X device in the extended mode may transmit and receive control information during the CCH interval; when the V2X device enters the SCH interval, it may maintain the SCH interval until service/information exchange is terminated.

(e) Immediate mode: In the immediate mode, a V2X device may perform communication as in the altering mode and/or extended mode. However, if negotiation for information exchange is completed during the CCH interval, a V2X device in the immediate mode may initiate information exchange by immediately performing channel switching to a specified SCH instead of waiting for the CCH interval to be terminated. As shown in FIG. 4, the extended mode and the immediate mode may be used together.

In the channel coordination modes of FIG. 4, management information of multi-channels and information exchange and negotiation for service provision may be performed only via the CCH during the CCH interval. Reception of safety-related service and information or negotiation for information exchange between a service provider and a user may also be performed only via the CCH during the CCH interval.

A guard interval may be included between the CCH interval and the SCH interval. A guard interval may secure time needed for synchronization when a communication device performs frequency change or channel change. At the time of channel change, hardware timer operation may be initiated by a sync signal obtained from Coordinated Universal Time (UTC)-based estimation. Channel synchronization may be performed at 1 Pulse Per Second (PPS) intervals by using the UTC as a reference signal.

As an embodiment, a sync interval may include the CCH interval and the SCH interval. In other words, one sync interval may include two time slots, and each of the CCH interval and the SCH interval may correspond to time slot 0 and time slot 1. The start of the sync interval may coincide with the start of the common time reference second. During one second, an integer multiple of the sync interval may be included.

A V2X device may perform communication by using the Multi-channel Operation (MCO) technique employing multi-antennas. As an embodiment, the ETSI MCO design specified in the ETSI TS 102 646-4-2 mainly considers the following objectives.

A Channel Access (CA) method that effectively uses channel resources in multi-channels by using multi-antennas should be provided.

A mechanism should be provided, which allows a V2X device to effectively listen to a Service Announcement Message (SAM) providing V2X service information and to switch to the corresponding announced service channel.

A mechanism should be provided, which minimizes the interference effect between adjacent channels occurred when the same vehicle performs V2X transmission and reception by using two or more multi-antennas and adjacent channels.

The Control Channel (CCH) is a reference channel to which traffic safety-related messages such as Cooperative Awareness Message (CAM), Decentralized Environmental Notification Message (DENM), Topology (TOPO), and MAP are transmitted. Other safety messages not fully transmitted to the CCH may be provided through the SCH. If a safety message of a new type is added, the additional safety message may be provided through the SCH.

The SAM announces a V2X service provided through the Service Channel (SCH), where the SAM may be provided through a well-known reference channel For example, information on a V2X service provided in the ITS-G5A/B/D channel band may be provided through the SAM via a reference CCH. However, since provision of a V2X service through the CCH may affect provision of a safety message, the service may not be provided through the CCH. The information on a V2X service provided in each channel band may also be provided via an alternate reference SCH arbitrarily specified in the channel band through the SAM.

In what follows, structures and signaling fields of a Localized Message Network Protocol Data Unit (LM NPDU) and a Service Advertisement Message (SAM)/WAVE Service Advertisement (WSA) will be described.

Service advertisement may be used to announce an ITS service capable of accessing a peer station operating as an ITS station, a WAVE device, or a V2X communication device. The service advertisement may be performed based on the Fast Service Advertisement Protocol (FSAP, ISO24102-5, ISO 21217) or the WAVE Service Advertisement (WSA, IEEE 1609.0). Service advertisement functions from the perspectives of a service provider and a service user are given below.

A service advertisement manager may transmit an SAM and receive a Service Response Message (SRM) for service management. The service advertisement manager may receive the SAM and transmit the SRM for client management. A service provider may provide an ITS service. A service user may receive the ITS service.

An ITS service may be provided through an ITS application. An ITS application is identified by a globally defined, unique ITS application identifier (ITS-AID, ISO 17419) in the OSI transport (or ITS station transport). For example, the IEEE WAVE uses a unique Provider Service Identifier (PSID, IEEE 1609.3, IEEE 1609.12) as the ITS-AID for identifying an ITS application. In this case, ITS-AID and PSID may indicate the common identifier. Also, ITS port number (ITS-PN) is used to identify the source and the destination of a message in the OSI transport. For example, the acronym PORT_SAM is used to identify the service advertisement protocol for receiving an SAM, and a dynamically allocated acronym PORT_DYN_SAM is used to identify the service advertisement protocol for receiving a unicast SAM.

FIG. 5 illustrates a structure of an LM NPDU according to an embodiment of the present disclosure.

The LM NPDU is a network protocol header and is attached to the front of the SAM described below. In general, the LM NPDU may provide information on the features of the network layer and information on the features of the transport layer. FIG. 5 shows a basic structure of the LN NPDU, which may be expressed in the binary format according to the Unaligned Packet Encoding Rules (UPER) applied to the ASN.1 type SAM.

When the LM NPDU transmits the SAM, the LM NPDU may also be referred to as a service advertisement message.

In FIG. 5, the LM consists of three parts: N-header, T-header, and body. In the following, the respective fields of the three parts are described.

Subtype: A 4-bit unsigned integer number indicating a networking related feature. This field may express 16 subtypes that indicate the networking-related features. For example, the Subtype field may indicate a subtype such as Null-Networking, ITS station-internal forwarding, N-hop forwarding, and Geo-forwarding.

N-Extensions flag: A 1-bit unsigned integer number indicating existence of the N-Extension signaling field in the N-header. As an embodiment, if the bit value is 1, it may indicate existence of the N-Extensions flag, otherwise it may indicate absence of the N-Extensions flag.

Version: A 3-bit unsigned integer number indicating the LM protocol version. The initial protocol version number may be set to 3.

Depends on Subtype: Depending on the Subtype (depending on the networking feature), the Depends on Subtype field may or may not be used.

N-Extensions: This variable has an Element ID and represents information on the Extensions element used in the N-header. As an embodiment, the Extensions element may include at least one of Transmit Power Used, Channel Number, Data Rate, LM TX CIP, LM RX CIP, and Channel Busy Ratio. Descriptions of the elements are given below.

Transmit Power Used: Transmit power used, which may be used by an LM receiver and may be inserted to the LM-N header selectively.

Channel Number: A channel number used, which may be used by an LM receiver and may be inserted to the LM-N header selectively.

Data rate: Data rate applied, which may be used by an LM receiver and may be inserted to the LM-N header selectively.

LM TX CIP: A Communication Interface Parameter (CIP) set to the transmitter, which may be inserted to the LM-N header selectively.

LM RX CIP: It may be used in the Subtype and may be inserted selectively to the LM N-header as the CIP set by the ITS-SCU which has received the LM from a peer station.

Channel Busy Ratio: A 1-octet unsigned integer number indicating an observed CBR value in the range of 0% to 100% with a step of 0.5% in percentage units, where a number ranging from 201 to 255 may represent an unknown ratio.

Feature selector: A signaling field for selecting a feature of the Transport Protocol Identifier (TPID) related to transport. This field may be expressed by a 7-bit unsigned integer number.

T-Extensions flag: A signaling field for indicating existence of the T-Extension signaling field in the T-header. This field may be expressed by a 1-bit unsigned integer number. If the bit value is 1, it may indicate existence of the T-Extensions field, otherwise it may indicate absence of the T-Extensions field.

Depends on TPID: Depending on the feature selector or the transport-related feature, the Depends on subtype field may or may not be used.

T-Extensions: T-Extensions may have an Element ID, and the Extensions element used in the T-header may include a Packet ID.

Length of User Data: A signaling field representing octets of data contained therein, which has a length of 1 octet (0-127 (0xEF)) or 2 octets (128 (0x8080)-16383 (0xBFFF)).

User Data: This field represents data such as the SAM contained in a data unit.

FIG. 6 illustrates a structure of an SAM according to an embodiment of the present disclosure.

An SAM advertises service information provided by an ITS application or an ITS application class. An SRM may be used for receiving a service requiring to use a specifically allocated communication channel. FIG. 6 shows a basic structure of the SAM, which may be expressed in the binary format according to the UPER applied to the ASN.1 type SAM.

In FIG. 6, the SAM consists of a header and a body. In the following, the respective signaling fields of the header and the body are described.

Version: A 4-bit unsigned integer number indicating the service advertisement protocol version. The initial protocol version number may be set to 3.

Option selector: The Option selector field indicates existence of an optional signaling field in the SAM format. This field may be expressed by a 4-bit unsigned integer number, the respective bits of which may indicate existence of the SAM Extensions field, existence of the Service Info Segment field, existence of the Channel Info Segment field, and IPv6 Routing Advertisement field.

SAM-ID: A signaling field indicating the number of different advertisements allowed for the same station (or the same service advertisement provider). This field may be expressed by a 4-bit unsigned integer number and may indicate up to 16 different service advertisements.

SM Count: A signaling field for detecting change of the content of service advertisement having the SAM-ID field by using the ASN.1 type cyclic counter. This field may be expressed by a 4-bit unsigned integer number. Each SAM-ID may be assigned a different SAM counter. At the first transmission of a new SAM, the SAM counter may be set as 'SAM counter=0'. When there is a content change in the service advertisement of the SAM, the SAM counter is incremented by 1, and when the SAM counter reaches 15, it may be again set as 'SAM Counter=0'. The content of the SAM may be changed when a service already advertised is changed, a new service is added, or a service is provided intermittently.

SAM Extensions: The existence of the SAM Extensions field, which is an optional variable, may be determined by the value of bit 3 of the Option selector field.

Service Info Segment: The existence of the Service Info Segment field, which is an optional variable, may be determined by the value of bit 2 of the Option selector field.

Channel Info Segment: The existence of the Channel Info Segment field, which is an optional variable, may be determined by the value of bit 1 of the Option selector field.

IPv6 Routing Advertisement: The existence of the IPv6 Routing Advertisement, which is an optional variable, may be determined by the value of bit 0 of the Option selector field.

FIG. 7 illustrates a structure of an SAM Extensions field according to an embodiment of the present disclosure.

The SAM Extensions field of FIG. 6 may be composed of the following elements as shown in FIG. 7. An Extensions element is used to provide additional information related with a message, and Extensions elements to be newly defined in a future are required to maintain backward compatibility. FIG. 7 illustrates a basic structure of Extensions elements, and the respective elements provide Element ID, Length, and Extension Data. The respective signaling fields are described below.

Count N: The Count N field has a variable length and indicates the number of contiguous Extensions elements.

Element ID: A 1-octet unsigned integer number that may be used to identify the type of the Extension Data field. A receiver may ignore an unidentified Element ID and may move on to the next Element ID for identification. To move to the next Element ID, the Length field may be used.

Length: The Length field indicates the number of octets contained in the Extension Data field. The size of 1 octet ranges from 0 (0x00) to 127 (0xEF), where the Most Significant Bit (MSB) is always set to '0', and the remaining 7 bits may be used to represent an unsigned integer number. The size of 2 octets ranges from 128 (0x8080) to 16383 (0xBFFF), where the MSB of the first octet may be always set to '1', and the second MSB of the first octet may be set to '0'. The remaining 14 bits may be used to represent an unsigned integer number.

Extension Data: This field contains information on the Extension Data with an Element ID. FIG. 8 illustrates Extensions elements and Element IDs according to an embodiment of the present disclosure.

FIG. 9 illustrates a structure of a Service Info Segment of an SAM according to an embodiment of the present disclosure.

FIG. 9 shows a structure of the Service Info Segment of FIG. 6. The ASN.1 type optional Service Info Segment provides information related to a service advertised through the SAM. The basic signaling fields may be structured as shown in FIG. 9. The signaling fields comprising the Service Info Segment are described below.

Count N: The Count N field has a variable length and indicates the number of pieces of information on a continuous service.

ITS-AID: The ITS-AID field has a variable length and indicates the ID of an advertised service.

Channel Index: The Channel Index field may be expressed by a 5-bit unsigned integer number. The Channel Index field may be used as a pointer indicating the n-th channel parameter set information of the Channel Info Segment. As a result, the Channel Index field may provide channel parameter information related to a provided service. For example, if the Channel Index=1, the Channel Index field may indicate the first channel parameter set. If the Channel Index=2, the Channel Index field may indicate the second channel parameter set. The Channel Index may provide a value ranging from 1 to 31. The Channel Index value of 0 may be used when a service channel is required to be changed or is not needed.

Option Selectors: The Option Selectors field may indicate existence of an optional signaling field as follows. If bit 2 is '1'b, it may indicate existence of a System Service field. If bit 1 is '1'b, it may indicate existence of the Replay Port Number field. If bit 0 is '1'b, it may indicate existence of the Service Info Extensions field.

System Service: This field is an optional signaling field, the existence of which may be checked from the bit 2 of the Option Selectors field. If the ITS-AID=0, it may indicate existence of the System Service field.

Reply Port Number: This field is an optional signaling field, the existence of which may be checked from the bit 1 of the Option Selectors field. The Replay Port Number is a destination port number of a message provided by a service provider and may be used by a service user.

Service Info Extensions: This field is an optional signaling field, the existence of which may be checked from the bit 0 of the Option Selectors field. Referring to FIG. 8, the Extensions elements used in the Service Info Extensions may be summarized as shown in FIG. 10.

FIG. 10 illustrates Extensions elements used in a Service Info Segment according to an embodiment of the present disclosure.

The respective elements shown in FIG. 10 are described below.

Provider Service Context: The Provider Service Context element may provide additional information related to an advertised application and may have a length amounting to 1 octet to 31 octets.

IPv6 Address: The IPv6 Address element is used when an application uses an IP address. This element may provide a 128-bit address of a device hosting an advertised application and follow the ITEF RFC 4291 format.

Service Port: The Service Port element is used when an application uses an IP address. This element may provide a 16-bit port number (for example, an UDP port number or a TCP port number) of a higher layer entity providing a service.

Provider MAC Address: The Provider MAC Address element provides a 48-bit MAC address of a device providing an application when a device providing the application and a device transmitting the SAM are different from each other.

Received Channel Power Indicator (RCPI) Threshold: This element indicates the recommended minimum strength (dBm) of a received SAM signal, where an SAM received with a strength less than 0 to 110 dBm may be ignored.

WSA Count Threshold: This element indicates the recommended minimum number of SAM/WSA receptions. The WSA Count Threshold element has a length of 1 octet and may be configured to range from 0 to 255. At this time, the SAM/WSA received less than the recommended number of times may be ignored.

WSA Count Threshold Interval: An optional element that may be used together with the SAM/WSA Count Threshold, and the received SAM/WSA Count indicates a valid time interval. In other words, if the SAM Count Threshold Interval is set, the SAM Count operates only within the allowed time period. At this time, the time interval has a length of 1 octet, and an unsigned integer number in the range of 1 to 255 (in units of 100 ms) is used to set the value of the time interval. The SAM Count Threshold Interval element is not used, the default value may be set to be 1 second.

SAM Application Data: This element contains application data and may allow the Fast Service Advertisement Protocol (FSAP) for transmission of a short message.

FIG. 11 illustrates a structure of a Channel Info Segment of an SAM according to an embodiment of the present disclosure.

FIG. 11 illustrates a structure of the Channel Info Segment of FIG. 6. The ASN.1 type optional Channel Info Segment provides information related to a service advertised through the SAM. The basic signaling fields may be structured as shown in FIG. 11. The signaling fields comprising the Channel Info Segment are described below.

Count N: The Count N field has a variable length and indicates the number of continuous channel information sets. Each channel information set may represent one channel feature related to 0 or more service Info sets.

Operating Class: The Operating Class field has a size of 1 octet and may perform the same function as the operating class of the IEEE 802.11. This field provides information related to the channel number field/information so that a specific channel may be identified uniquely within a nation or a region.

Channel Number: The Channel Number field has a size of 1 octet and may perform the same function as the operating class of the IEEE 802.11. The Channel Number field indicates the unique channel number of a channel providing a service. Each Channel Info set may have a pair of the Operating Class and the Channel Number fields different from other pairs.

Transmit Power Level: The Transmit Power Level field has a size of 1 octet. This field indicates a transmit power level required for a service providing channel to perform transmission, which may be expressed in terms of Effective Isotropic Radiated Power (EIRP). This field may be set to have a value in the range of −128 dBm to 127 dBm. The configured EIRP may represent the maximum power.

Adaptable: The Adaptable field indicates whether the value of the Data Rate field configured by 1 bit is a fixed value or a boundary value. For example, if the Adaptable field value is 1, the Data Rate value indicates the allowed minimum boundary value while, if the Adaptable field value is 0, the Data Rate value may indicate a fixed value.

Data Rate: The Data Rate field indicates a data rate allowed in a channel and may be expressed by a 7-bit unsigned integer value. The field value is configured to be in the range of 0x02 (1 Mb/s) to 0x7F (63.5 Mb/s) and is incremented in units of 500 kbit/s. If Adaptable='1', the Data Rate value means the allowed minimum boundary value while, if Adaptable='0', the Data Rate value means a fixed value.

Option Selector: The Option Selector field has a size of 1 octet and may indicate 8 option selection bits. As an embodiment, if bit 0 of the Option Selector field is '1', it may indicate existence of the Channel Info Extensions field while, if bit 0 of the Option Selector field is '0', it may indicate that the Channel Info Extensions field does not exist.

Channel Info Extensions: The Channel Info Extensions field is an optional signaling field, existence of which may be checked through bit 0. The Extensions element used in the Channel Info Extensions field may include at least one of the EDCA parameter set element or the channel access element. The EDCA parameter set element may provide MAC layer channel access parameter information to be used for communication among various devices in the corresponding channel. The channel access element may indicate a time slot through which a service provider may provide a service in the corresponding channel. As an embodiment, the channel access element value described in the WSA (IEEE 1609.3) is as follows. If the channel access element value is 0, it corresponds to continuous access and indicates both the time slot 1 and the time slot 2. If the channel access element value is 1, it corresponds to alternating access and indicates only the time slot 0 while, if the channel access element value is 2, it corresponding to alternating access but indicates only the time slot 1.

FIG. 12 illustrates a structure of IPv6 Routing Advertisement information of an SAM according to an embodiment of the present disclosure.

FIG. 12 illustrates the structure of the IPv6 Routing Advertisement field shown in FIG. 6. The ASN.1 type IPv6 Routing Advertisement information provides information necessary for connecting to the Internet infrastructure so that a receiving vehicle/terminal may connect to the IPv6 network providing services. The structure of the basic signaling field may be constructed as shown in FIG. 12. The signaling fields comprising the IPv6 Routing Advertisement information are described below.

Router Lifetime: The Router Lifetime field is a field described in the IETF RFC 4861 and defines the duration for which information related to the default gateway is valid. As a result, it is not possible to use information beyond the valid time duration.

IPv6 Prefix: The IPv6 Prefix field is a field described in the IETF RFC 4861 and provides the IPv6 subnet prefix of the corresponding link.

IPv6 Prefix Length: The IPv6 Prefix Length field is a filed described in the IETF RFC 4861 and provides information on the number of significant bits in the IPv6 Prefix field.

Default Gateway: The Default Gateway field provides a 128-bit IPv6 address of a router providing access to inter-networks via a subnet.

Primary DNS: The Primary DNS field provides a 128-bit IPv6 address of a device capable of providing a Domain Name System (DNS) lookup for a subnet device.

IPv6 Routing Extensions: The Extensions element used in the IPv6 routing advertisement may include at least one element of the secondary DNS element or the gateway MAC address. The secondary DNS element provides a 128-bit IPv6 address of an alternative device capable of providing a DNS lookup for a subnet device. The gateway MAC address element is an element used when the MAC address and the gateway address of a device transmitting the SAM are different from each other and represents the 48-bit MAC address related to the default gateway.

As described above, smart cars connect drivers, vehicles, traffic infrastructure, etc. to provide a variety of customized mobility services as well as traditional vehicle technologies such as traffic safety/complexity reduction. This connectivity can be implemented using various V2X communications such as ITS-G5 of Europe, WAVE of United States, and New Radio (NR). The NR may mean a cellular V2X communication technology such as LTE-V2X and 5G-V2X. The NR may also mean a cellular-based novel vehicle-to-vehicle communication technology. To efficiently operate the V2X communication technology, V2X services and a multichannel operation (MCO) technology using multi-antenna have been developed. A signalling method for efficiently supporting various channel resource operation technologies and services has also been developed. The following proposes an evolved SAM (eSAM) packet capable of supporting new network operation and service operation based on the above-described service advertisement message (SAM) packet. The SAM can be used to announce services capable of accessing a peer station operating at a position equivalent to the ITS station or the WAVE device, etc. The service advertisement message/SAM may be hereinafter referred to as eSAM. However, the eSAM is a name that is conveniently referred to distinguish a SAM of configuration proposed in the present disclosure from the existing SAM. That is, eSAM may also be referred to as service advertisement message/SAM.

The eSAM related technology proposed below may be summarized as follows.

1. Method of providing multichannel channel busy ratio (CBR) information using an eSAM packet:

Using a localized message network protocol data unit (LM NPDU) structure used to provide single channel CBR information using an existing SAM packet, this method provides CBR information on multichannel by configuring and using the eSAM packet.

2. Method of providing channel access (CA) mode information using an eSAM packet:

Using a generalized LM NPDU structure, information related to four multichannel access modes (asynchronous multichannel access (MA) mode, ETSI MA mode, sequential MA mode, and mixed MA mode) and mode set-up parameter information are provided. In the present disclosure, multichannel access (MA) may also be referred to as channel access (CA).

3. Reference channel operation method for eSAM packet transmission and related mode information providing method:

There is a method of selecting the existing CCH or any SCH as a reference channel and transmitting a SAM packet. On the other hand, the present disclosure proposes a method of transmitting an eSAM packet using both CCH and SCH. The eSAM packet transmitted using the CCH can provide main network configuration related multichannel access mode/related setup parameter and eSAM packet transmission mode information. The eSAM packet transmission using the SCH may be determined based on three eSAM packet transmission modes provided in the CCH. The three modes include i) a mode in which the eSAM packet is transmitted using one SCH previously defined/allocated for all the channels, ii) a mode in which the eSAM packet is transmitted using all the SCHs, and iii) a mode in which all the channels are divided into several sub-bands and the eSAM packet is transmitted using one SCH previously defined/allocated in each sub-band. Further, the present disclosure proposes a method of providing eSAM packet transmission mode information using the LM NPDU structure. Hereinafter, configuration of the eSAM packet and related information providing method are described in more detail.

FIG. 13 illustrates configuration of an eSAM packet according to an embodiment of the present disclosure.

An eSAM packet includes a packet header and a packet body. The eSAM packet header includes an N-header and a T-header in the same manner as the above-described LM-NPDU. The description of configuration of the eSAM packet header equivalent to the LM-NPDU is omitted.

The N-header includes fields defining network related features. The T-header includes fields defining transport related features. The packet body includes a SAM header and a SAM body. The packet body, i.e., SAM includes service related advertisement contents and a parameter for system setup.

FIG. 14 illustrates a CBR information signalling method according to an embodiment of the present disclosure.

FIG. 14 illustrates configuration for signalling CBR information of channel in an LM NPDU illustrated in FIG. 6. As illustrated in FIG. 14, channel busy ratio (CBR) information may be included in an N-extensions field of an N-header of the LN NPDU, as an element. However, the CBR information illustrated in FIG. 14 provides only CBR information for a single channel.

FIG. 15 illustrates a CBR information signalling method according to another embodiment of the present disclosure.

FIG. 15 illustrates eSAM packet configuration and a CBR information providing method for multichannel using the LM NPDU structure illustrated in FIG. 14. In FIG. 15, the present disclosure proposes a method of providing multichannel CBR information using an N-extensions signalling field of an N-header. As illustrated in FIG. 15, additional CBR information, as an additional CBR element, is inserted into an N-extensions field of the N-header.

In an embodiment of FIG. 15, CBR information on channel on which service is provided may be provided in a CBR element, and CBR information on other channel other than the channel on which service is provided may be provided in an additional CBR element. The CBR information on other channel other than the channel on which service is provided may be received from a neighboring vehicle or measured using a multi-transceiver.

In the embodiment, CBR information on channel on which SAM information is transmitted may be provided in a CBR element. That is, CBR information on channel on which a LM-NPDU including a SAM is transmitted may be provided in the CBR element. Further, CBR information on at least one other channel, on which service can be provided, may be provided in an additional CBR element.

The additional CBR information may be provided as many as n channels, in which the CBR information is effective, other than the channel on which service is provided. Alternatively, the additional CBR information may be provided as many as n channels, on which service is provided and in which the CBR information is effective, other than channel on which the SAM is transmitted.

FIG. 16 illustrates a channel access mode signalling method according to an embodiment of the present disclosure.

FIG. 16 illustrates eSAM packet configuration and a method of providing channel access mode information for multichannel using the LM NPDU structure illustrated in FIG. 14. In FIG. 16, the present disclosure proposes a method of providing channel access mode information using an N-extensions signalling field of an N-header. As illustrated in FIG. 16, additional multichannel access mode information and multichannel access interval information, as an element, are inserted into an N-extensions field of the N-header.

In an embodiment of FIG. 16, multichannel access mode information may be signalled in 3 bits. In the embodiment, multichannel signalling information for each case may indicate an access mode as follows.

'000'b: Asynchronous MA mode
'001'b: ETSI MA mode
'010'b: Sequential MA mode
'011'b: Mixed MA mode
'100' b~'111'b: Reserved MA mode The multichannel access interval information may be signalled in 14 bits. The multichannel access interval information is a default parameter for a multichannel access mode setting in a channel Info extensions field within a channel information/Info segment. The multichannel access interval information may define a safety interval value and a non-safety interval value as follows.

Safety interval (7 bits): 0-127 in units of ms (e.g., 50 ms)
Non-safety interval (7 bits): 0-127 in units of ms (e.g., 50 ms)

A synchronous interval is calculated as a sum of the safety interval and the non-safety interval. If the multichannel access mode is the asynchronous MA mode, the safety interval and the non-safety interval may be set to 0. Even if the safety interval value and the non-safety interval valve are defined in a multichannel access interval element, it may not be applied when safety interval information and non-safety interval information are provided using a signalling field of channel Info extensions within a channel Info segment field in the SAM structure.

A safety message and a SAM may be provided during the safety interval, and V2X service may be provided during the non-safety interval. The non-safety interval may be referred to as a service interval. The safety interval and the service interval may be divided in a time division multiplexing (TDM) scheme in a time domain.

The channel access mode is described as below. In the present disclosure, the channel access (CA) mode may be referred to as a multichannel access (MA) mode.

(1) Asynchronous MA Mode ('000'b)

In the asynchronous MA mode, one reference SCH is configured. A safety interval and a non-safety interval are not defined in a multichannel including the reference SCH. In the reference SCH, a vehicle may perform a safety message transmission or a SAM transmission through contention. After receiving the SAM, the vehicle may move directly to the corresponding SCH on which service of interest is provided, and may receive related services.

(2) ETSI MA Mode ('001'b)

In the ETSI MA mode, one reference SCH is configured. The ETSI MA mode may be referred to as a base MA mode. A safety interval and a non-safety interval are defined in a multichannel including the reference SCH, and the multichannel operates in the TDM scheme. A safety interval and a non-safety interval of each SCH are equally set and are arranged so that the overlapping occurs between the channels. During the safety interval, the vehicle moves to the configured reference SCH and transmits the safety message or the SAM, and the transmission in the interval may be performed based on the contention. During the safety interval of the reference SCH, it is impossible to use SCH-x channel After receiving the SAM, the vehicle may move directly to the corresponding SCH on which service of interest is provided during the non-safety interval, and may receive related services.

The ETSI MA mode may be referred to as an overlapping MA mode.

FIG. 17 illustrates an ETSI MA mode according to an embodiment of the present disclosure.

A V2X communication device may include a plurality of transceivers. A transceiver that accesses the CCH and performs the communication in the CCH may be referred to as a CCH transceiver, and a transceiver that accesses the SCH and performs the communication in the SCH may be referred to as a SCH transceiver. The ETSI MA mode of FIG. 17 may be referred to as an overlapping MA mode. In the ETSI MA mode, a safety interval and a non-safety interval of each SCH are equally set and are arranged so that the overlapping occurs between the channels.

As illustrated in FIG. 17(a), the CCH transceiver of the V2X communication device may monitor the CCH and perform the communication in the CCH. The V2X communication device may send and receive a safety message using the CCH transceiver. The safety message may also be provided through contention without the application of a multiplexing method.

As illustrated in FIG. 17(b), the SCH transceiver of the V2X communication device may monitor the SCH and perform the communication in the SCH. The V2X communication device may send and receive a safety message, a SAM, or V2X service using the SCH transceiver.

The SCH may include a reference SCH and SCH-x (x-th SCH and remaining SCH except the reference SCH in a channel allowed to provide the V2X service). For each SCH, a channel bandwidth may be divided into a safety interval and a service interval. The safety message and the SAM may be provided in the safety interval, and the V2X service may be provided in the service interval. The safety interval and the service interval may be divided in a time division multiplexing (TDM) scheme in a time domain.

In FIG. 17, synchronous intervals for the SCH access are overlapped for each SCH. That is, for each SCH, the SCH transceiver performs the communication in the same synchronized safety interval and service interval. As illustrated in FIG. 17, the MA mode, that performs the communication based on the synchronous interval synchronized for each SCH and the same safety interval/service interval, may be referred to as a base MA mode or a basic MA mode.

The SAM, i.e., the service advertisement message is a message that announces a communication access technology used to access the services and available user services. The SAM may include the provided services, the communication access technology, other information required to access the services. In the present disclosure, the SAM may be referred to as a service information message.

The reference SCH is a default channel in which a SCH-transceiver is disposed when there is no V2X service. The synchronization between the basic safety interval and the service interval may be performed in the reference SCH. The safety message and the SAM may be provided on the reference SCH among the SCHs. In the embodiment, the transmission of the safety message and the SAM is allowed during the safety interval, but the transmission of the safety message and the SAM may not be allowed during the service interval. The SAM may provide both information on the service provided in the reference SCH and information on the service provided on the SCH-x.

The SCH transceiver may access the reference SCH and send and receive the safety message during the safety interval. The SCH transceiver may access the reference SCH and send and receive the SAM during the safety interval, and may move to the reference SCH or the SCH-x and transmit and receive the V2X service during the service interval. A length of the synchronous interval may be equal to a sum of the safety interval and the service interval. That is, the synchronous interval may be divided into the safety interval and the service interval.

The SCH-x is a channel on which the V2X service is provided, and the transmission and reception of the safety message may not be allowed in the SCH-x. During the safety interval, the SCH transceiver may access the reference SCH and send and receive the safety message and the SAM. In the embodiment, the SCH transceiver may also maintain an idle state in the safety interval. The SCH transceiver may access the corresponding SCH in the service interval and transmit and receive services, in order to use V2X service of interest among services indicated by SAM information received during the safety interval.

(3) Sequential MA Mode ('010'b)

In the sequential MA mode, the reference SCH is not configured, but one virtual reference SCH may operate. For a multichannel including the virtual reference SCH, a safety interval and a non-safety interval are defined, and the multichannel may operate in the TDM scheme. Unlike the base MA mode, the safety intervals of the SCHs are arranged not to overlap each other, and it is possible to use the SCH-x channel during the safety interval of each SCH. During the safety interval, the vehicle may transmit the safety message or the SAM in the SCH-x, and the transmission may be performed based on the contention. After receiving the SAM, the vehicle may receive services during the non-safety interval while staying in the channel receiving the SAM if there are services of interest.

FIG. 18 illustrates a sequential multichannel access mode according to an embodiment of the present disclosure.

As illustrated in FIG. 18(a), the CCH transceiver may transmit/receive a safety message in the CCH. As illustrated in FIG. 18(b), the SCH transceiver may transmit/receive a safety message/SAM and V2X service in the SCH.

In an embodiment of FIG. 18, the SCH includes a virtual reference SCH and SCH-x (e.g., normal SCH such as SCH-a and SCH-b). Each SCH may be time-division multiplexed (TDM) into a safety interval and a service interval. For each SCH, the use of the safety interval may be allowed. In order to increase channel usage efficiency, the safety intervals may be configured not to overlap each other by relatively delaying the safety interval of each channel. In the sequential CA mode, a synchronous interval of a subsequent accessing SCH may be delayed by a length of a safety interval of a preceding accessing SCH.

The virtual reference SCH is a default channel disposed when the SCH transceiver is turned on. The synchronization between the basic safety interval and the service interval may be performed in the virtual reference SCH. Compared to the above-described reference SCH, the virtual reference SCH is a virtual channel for performing a basic synchronous related setup required in the CA operation. The virtual reference SCH may be randomly designated, and the virtual reference SCH may not be configured if necessary. A length of the synchronous interval may be a sum of the safety interval and the service interval.

For the SCH-x (including the virtual reference SCH), the safety intervals may be configured not to overlap each other by relatively delaying a safety interval of each SCH. A length of the synchronous interval defined for each SCH may be the same. A safety message may be transmitted in the safety interval of each SCH. The V2X device may consecutively transmit the safety message in each safety interval of each SCH while sequentially moving the SCH similarly to the CCH.

The SAM transmitted in the safety interval of each SCH may include V2X service information provided in the corresponding SCH. In terms of the V2X service provider, the SAM transmitted during the safety interval of each SCH may include only V2X service information provided in the corresponding SCH. In terms of the V2X service user, if the SAM received during the safety interval of each SCH informs that V2X service of interest is provided in the corresponding channel, the V2X device may receive the corresponding service without channel movement. In terms of the V2X service user, if the SAM received during the safety interval of each SCH informs that there is no service of interest from the SAM received in the safety interval of the corresponding SCH, the V2X device may reserve the consecutive movement and then access the SCH, receive the SAM in the safety interval of the accessed SCH, and grasp services provided in this channel.

(4) Mixed MA Mode ('011'b)

In the mixed MA mode, the multi-channels may be divided into a plurality of channel bands and operate, and each channel band may consist of two or more multi-channels. Each channel is configured as one reference SCH, and as a result, a plurality of reference SCHs may exist. For the multi-channel including the reference SCH of each channel band, a safety interval and a non-safety interval are defined, and the intervals may operate in the TDM scheme. In each channel band, a safety interval and a non-safety interval of each SCH may be equally set and may be arranged to overlap each other between the channels. During the safety interval in each channel band, the vehicle may access the reference SCH and send a safety message or a SAM. During the safety interval of the reference SCH, it may be impossible to use the SCH-x channel. During the non-safety interval in each channel band, the vehicle may move to the SCH of interest and receive related services. The safety intervals of the SCHs including the reference SCHs between the channel bands may be arranged not to overlap each other between the channels. During the safety interval of the SCH of the channel band, the SCH-X channel of other channel band may be used.

FIG. 19 illustrates a mixed CA operation method according to an embodiment of the present disclosure.

In an embodiment of FIG. 19, as described above, the above-described base MA method may be applied in the reference channel band, and the above-described sequential MA method may be applied between the channel bands.

In FIG. 19, it is assumed that a channel band-X is a virtual reference channel. The channel band-X and a channel band-Y have the same length of a synchronous interval, the same length of a safety interval, and the same length of a service interval, and safety intervals of reference SCHs of each channel band do not overlap. The synchronous interval of the channel band-Y is delayed by the safety interval of the channel band-X. It can be seen from FIG. 19 that the SCH transceiver provides virtual consecutive SCHs and consecutive safety interval as in the CCH by sending and receiving a safety message while sequentially tuning the channel band-X and the channel band-Y.

FIG. 20 illustrates a channel access mode signalling method according to another embodiment of the present disclosure.

FIG. 20 illustrates a channel access mode signalling method using a channel info segment of a SAM illustrated in FIG. 11. In an embodiment of FIG. 20, multichannel access mode information and multichannel access interval information may be included in a channel info extensions field included in the channel info segment of the SAM.

A safety interval value and a non-safety interval value may be defined in a multichannel access interval element as illustrated in FIG. 16. Even in this case, as illustrated in FIG. 20, the SAM may be sent by including the multichannel access mode information and the multichannel access interval information in the channel info extensions field of the SAM. The multichannel access interval information may be signalled in 14 bits. The multichannel access interval information may be signalled as below.

Safety interval (7 bits): 0-127 in units of ms (e.g., X ms)
Non-safety interval (7 bits): 0-127 in units of ms (e.g., Y ms)

X and Y values may be set to any value. In an embodiment, the X and Y values may be set to values that are not defined in the multichannel access interval element. If the X and Y values have the same values as values defined in the multichannel access interval element, the safety interval value and the non-safety interval value may not be defined in the SAM.

A synchronous interval is calculated as a sum of the safety interval and the non-safety interval. If the multichannel access mode is an asynchronous MA mode, the safety interval and the non-safety interval may be set to 0. However, the safety interval value and the non-safety interval value defined in the SAM may have priority on the values defined in the multichannel access interval element.

A method of configuring and operating a reference channel for transmission of a SAM packet or an e-SAM packet is described below.

The V2X device may transmit a SAM packet by configuring the CCH or any SCH as a reference channel The method of transmitting the SAM packet using the CCH is first described. When the SAM packet is transmitted using the CCH, reference channel related signalling information is not necessary since the CCH is pre-defined. The SAM packet provides service information provided in each SCH and detailed parameter information required in a system operation. A channel access method of the SCH may be pre-defined and used.

The method of transmitting the SAM packet using the SCH is described. In this case, the SAM packet may not be transmitted in the CCH. When the SAM packet is transmitted using the reference channel SCH, the reference channel needs to be previously defined/allocated, and thus reference channel related signalling information may not be necessary. A mechanism in which the SAM packet is transmitted may be differently defined depending on a channel access mode, and a channel access mode and a SAM packet transmission mechanism should be determined in advance. A method of transmitting a plurality of SAM packets may be used depending on the channel access mode.

As a first case, the SAM packet may be transmitted using one SCH previously defined/allocated for all the channels. As a second case, the SAM packet may be transmitted on one SCH defined/allocated previously in each sub-band by dividing all the channels into a plurality of sub-bands. As a third case, the SAM packet may be transmitted using all the SCHs.

The reference channel operation method for the above-described eSAM packet transmission is described below. The proposed operation method can transmit the eSAM packet using at least one of the CCH and the SCH.

(1) First Method of Transmitting the eSAM Packet on the CCH

The eSAM packet may be transmitted on the CCH. In this case, the eSAM packet provides only network configuration information and other simple service information, and related detailed information may be provided by the eSAM packet on the SCH. The eSAM packet may provide a multichannel access mode and a related mode setup parameter considering the multichannel operation. The eSAM packet may provide the eSAM packet transmission method on the SCH and related parameters considering the multi-channel operation. The eSAM packet may include a channel on which each service is provided, and advertisement contents related to each service. The eSAM packet information provided in the CCH may be different depending on the selected channel access mode. The detailed parameter information required in the system operation may be received in the SCH.

(2) Second Method of Transmitting the eSAM Packet on the CCH

The eSAM packet may provide network configuration information and service information provided in each SCH. Unlike the first method, the eSAM packet may not be transmitted on the SCH. The multichannel access method and signalling information for the eSAM packet transmission mode may be provided by the eSAM packet in the CCH, or may be provided by other control message such as a beacon.

(3) Third Method of Transmitting the eSAM Packet on the SCH

A method of transmitting the eSAM packet on the SCH and a method of signalling the corresponding method are described below.

(3-1) mode ('000'b): a mode in which a reference channel SCH for all the channels is not defined, and the eSAM packet is not transmitted on the SCH The (3-1) mode may be used when applying to the above-described second method. That is, in the (3-1) mode, the eSAM packet may be transmitted on the CCH. The channel access method on the SCH may be pre-defined and used. For example, the asynchronous MA mode, the ETSI MA mode, the sequential MA mode, or the mixed MA mode may be used.

(3-2) mode ('001'b): a mode in which the eSAM packet is transmitted on one defined/allocated reference channel SCH for all the channels One reference channel SCH may be previously defined/allocated. The reference channel SCH may be adaptively/flexibly determined considering a traffic usage rate, etc. of each SCH. The determined reference channel SCH may be signalled through the eSAM packet transmitted on the CCH. As the channel access mode, the asynchronous MA mode or the ETSI MA mode may be applied.

In the (3-2) mode, the eSAM packet may provide a channel for each service, advertisement contents related to each service, and system parameter information related to service transmission and reception. The eSAM packet may also provide multichannel CBR information. This mode can improve a reception rate and the accuracy of the multichannel CBR information using channel diversity by providing the multichannel CBR information in the SCH as well as the CCH. The V2X device may compare multichannel CBR time stamp information provided in the CCH with CBR information of eSAM information and may use the latest measured CBR information. If a congestion level is high in the CCH, the problem that the reception of the multichannel CBR information is delayed can be solved. Further, the problem that a reception rate of the multichannel CBR information is reduced due to a poor CCH environment can be compensated.

(3-3) mode ('010'b): a mode in which the eSAM packet is transmitted using all the SCHs The eSAM packet may be transmitted in all the SCHs, and examples of the applicable MA mode include the asynchronous MA mode or the sequential MA mode.

In the (3-3) mode, the eSAM packet may provide service related advertisement contents provided in the corresponding SCH and system parameter information related to service transmission and reception. Information on services provided in other SCH may be received by changing the channel. The eSAM packet may provide CBR information of the corresponding channel, i.e., single-channel CBR information. This mode can improve a receiving rate and the accuracy of the multichannel CBR information using channel diversity by providing the multichannel CBR information in the SCH as well as the CCH. To obtain the multichannel CBR information, the V2X device may receive the CBR information by changing the channel.

(3-4) mode ('011'b): a mode in which all the channels are divided into a plurality of sub-bands, and the eSAM packet is transmitted on one SCH defined/allocated previously in each sub-band For the (3-4) mode, examples of the applicable MA mode include the asynchronous MA mode, the ETSI MA mode, and the mixed MA mode. In the (3-4) mode, the eSAM packet may provide a channel on which each service is provided in each sub-band, advertisement contents related to each service in each sub-band, and system parameter information related to service transmission and reception. The eSAM packet may provide multichannel CBR information of each sub-band. By using channel diversity, a reception rate and accuracy of the multichannel CBR information can be improved. The V2X device may compare multichannel CBR time stamp information provided in the CCH with CBR information of eSAM information and may use the latest measured CBR information. If a congestion level is high in the CCH, the problem that the reception of the multichannel CBR information is delayed can be solved. Further, the problem that a reception rate of the multichannel CBR information is reduced due to a poor CCH environment can be compensated.

In each sub-band, the reference SCH may be flexibly selected and may be signalled through the eSAM packet transmitted on the CCH.

FIG. 21 illustrates an eSAM packet transmission method according to an embodiment of the present disclosure.

The V2X device may analyze conditions and an environment for selecting an eSAM packet transmission mode in S21010. Such an operation may be periodically performed, or aperiodically performed if there is a requirement.

The V2X device may determine whether change in the eSAM packet transmission mode or the CA mode is needed, in S21020.

If the change in the eSAM packet transmission mode or the CA mode is needed, the V2X device may determine the eSAM packet transmission mode and the CA mode in S21030. In an embodiment, the V2X device may determine the eSAM packet transmission mode, and then may determine the CA mode based on the determined eSAM packet transmission mode. In another embodiment, the V2X device may determine the CA mode, and then may determine the eSAM packet transmission mode based on the determined CA mode.

The V2X device may transmit an eSAM packet including information about the determined eSAM packet transmission mode and the determined CA mode on the CCH S21040. The V2X device may also transmit the eSAM packet on the SCH in S21050. Information included in the eSAM packet transmitted on the SCH may vary depending on the CA mode.

If the change in the eSAM packet transmission mode or the CA mode is not needed, the V2X device may maintain and use the pre-determined eSAM packet transmission mode and the pre-determined CA mode in S21060.

Since the eSAM packet transmission mode and the CA mode are closely related to each other, even if only one of the two modes is changed, the other mode may be reconfigured together.

FIG. 22 illustrates an eSAM packet reception method according to another embodiment of the present disclosure.

The V2X device may receive an eSAM packet on the CCH in S22010. The eSAM packet may include eSAM packet transmission mode information and CA mode information. The V2X device may parse the eSAM packet received on the CCH and obtain the eSAM packet transmission mode information and the CA mode information.

The V2X device may determine whether an eSAM packet transmission mode or a CA mode changes in S22020.

If the change in the eSAM packet transmission mode or the CA mode is needed, the V2X device may perform system setup/setting for receiving the eSAM packet in S22030. The V2X device may set up the eSAM packet transmission mode and the CA mode.

The V2X device may receive the eSAM packet on the SCH in S22040. The V2X device may receive services using the received eSAM packet information in S22050.

If the change in the eSAM packet transmission mode or the CA mode is not needed, the V2X device may maintain and use the pre-determined eSAM packet transmission mode and the pre-determined CA mode in S22060.

FIG. 23 illustrates a signalling method of an eSAM packet transmission mode according to an embodiment of the present disclosure.

FIG. 23 illustrates a method of providing eSAM packet transmission mode information using a LM NPDU structure. In FIG. 23, the present disclosure proposes a method of providing eSAM packet transmission mode information using an N-extensions signalling field of an N-header. In FIG. 23, the eSAM packet transmission mode information, as an element, is inserted into an N-extensions field of the N-header.

In an embodiment of FIG. 23, a SAM transmission mode element is added. An eSAM transmission mode may be referred to as a SAM transmission mode. Features of the SAM transmission mode (3 bits) are as follows.

'000'b: eSAM packet transmission mode (3-1)
'001'b: eSAM packet transmission mode (3-2)
'010'b: eSAM packet transmission mode (3-3)
'011'b: eSAM packet transmission mode (3-4)
'100'b~'111'b: Reserved MA mode Features of SAM SCH Number information are as below.

SAM SCH number information indicates a reference channel (SCH) number on which the SAM is transmitted. In the eSAM packet transmission mode (3-2), if the reference channel number is not predefined, or if the reference SCH can be changed, as illustrated in FIG. 23, a SAM SCH number element may provide a reference channel number. In the eSAM packet transmission mode (3-3), if the reference channel number is not predefined, or if the reference SCH can be changed, as illustrated in FIG. 23, the SAM SCH number element may provide the reference channel number in each sub-band.

FIG. 24 illustrates a V2X communication device according to an embodiment of the present disclosure.

As illustrated in FIG. 24, a V2X communication device 24000 may include a memory 24030, a processor 24020, and a communication unit 24010. As described above, the V2X communication device may correspond to an on-board unit (OBU) or a road side unit (RSU), or may be included in the OBU or the RSU. The V2X communication device may correspond to an ITS station or may be included in the ITS station.

The communication unit 24010 is connected to the processor 24020 and may transmit/receive a radio signal. The communication unit 24010 may up-convert data received from the processor 24020 into a transmission/reception band to transmit a signal. The communication unit 24010 may down-convert the received signal and forward the signal to the processor. The communication unit 24010 may implement an operation of an access layer. In an embodiment, the communication unit may implement an operation of a physical layer included in the access layer, or additionally implement an operation of a MAC layer. The communication unit may include a plurality of sub-communication units in order to perform communication according to a plurality of communication protocols. In an embodiment, the communication unit may perform communication based on various wireless local area network (WLAN) communication protocols and cellular communication protocols, such as 802.11, wireless access in vehicular environments (WAVE), dedicated short range communications (DSRC), and 4G (LTE; Long-Term Evolution).

The processor 24020 is connected to the communication unit 24010 and may implement operations of the layers according to the ITS system or the WAVE system. The processor 24020 may be configured to perform operations according to various embodiments of the present disclosure according to the figures and the description described above. Furthermore, at least one of a module, data, a program or software that implements operations of the V2X communication device 24000 according to various embodiments of the present disclosure may be stored in the memory 24030 and executed by the processor 24020.

The memory 24030 is connected to the processor 24020 and stores various information for driving the processor 24020. The memory 24030 may be included inside the processor 24020 or installed outside the processor 2420, and may be connected to the processor 24020 by known means. The memory may include a secure/non-secure storage device, or may be included in a secure/non-secure storage device. In embodiments, the memory me be referred to as a secure/non-secure storage device.

The detailed configuration of the V2X communication device 24000 illustrated in FIG. 24 may be implemented by independently applying various embodiments of the present disclosure or by applying together two or more embodiments of the present disclosure. In particular, in embodiments of the present disclosure, the communication unit may include a CCH transceiver performing the communication in the CCH and a SCH transceiver performing the communication in the SCH.

FIG. 25 is a flow chart illustrating a communication method of a hybrid V2X communication device according to an embodiment of the present disclosure.

A V2X communication device accesses a first channel in S25010. The first channel may correspond to a control channel In an embodiment, the first channel may correspond to a service channel The V2X communication device may receive a NPDU including a service advertisement message in S24020.

The V2X communication device may access the service channel and receive service data in S28030. The V2X communication device may parse the service advertisement message and perform the service channel access and the service data reception based on information included in the service advertisement message.

In an embodiment, the NPDU may include a N-header, a T-header, and a body. The N-header may provide network related information, the T-header may provide transport related information, and the body may include the service advertisement message. The service advertisement message provides service information and information on a service channel on which service is provided.

The service advertisement message may include a header part and a body part. The header part may include at least one of SAM ID information, SAM count information, and SAM extension information, and the body part may include service information and channel information.

The N-header may include CBR information on the first channel and additional CBR information on an additional channel. In another embodiment, a network header may include CBR information on a service channel on which service is provided and additional CBR information on an additional channel other than the service channel. As described above, the CBR information may indicate a percentage of channel usage for a specific channel.

The N-header may include at least one of multichannel access mode information and multichannel access interval information. The multichannel access mode information may indicate at least one of the asynchronous multichannel access mode, the overlapping multichannel access mode, the sequential multichannel access mode, or the mixed multichannel access mode.

The N-header may include at least one of transmission mode information of the service advertisement message and service channel number information on which the service advertisement message is transmitted. The transmission mode information of the service advertisement message may indicate at least one of a first mode in which the service advertisement message is transmitted on the control channel, a second mode in which the service advertisement message is transmitted on one reference service channel, a third mode in which the service advertisement message is transmitted on all the SCHs, or a fourth mode in which the channels are divided into a plurality of sub-bands, and the service advertisement message is transmitted on one reference service channel in the divided sub-band.

Based on the above-described embodiments, the first channel may correspond to the control channel or the service channel according to the transmission mode of the service advertisement message. For example, in the first mode in which the service advertisement message is transmitted on the control channel, the first channel may correspond to the control channel. Alternatively, in the second to fourth modes in which the service advertisement message is transmitted on the service channel, the first channel may correspond to the service channel.

The embodiments described above are combinations of constituting elements and features of the present disclosure in a predetermined form. Each individual element or feature has to be considered as optional except where otherwise explicitly indicated. Each individual element or feature may be implemented solely without being combined with other elements or features. Also, it is also possible to construct the embodiments of the present disclosure by combining a portion of the elements and/or features. A portion of a structure or feature of an embodiment may be included in another embodiment or may be replaced with the corresponding structure or feature of another embodiment. It should be clearly understood that the claims which are not explicitly cited within the technical scope of the present disclosure may be combined to form an embodiment or may be included in a new claim by an amendment after application.

The embodiments of the present disclosure may be implemented by various means such as hardware, firmware, software, or a combination thereof. In the case of hardware implementation, one embodiment of the present disclosure may be implemented by using one or more of ASICs (Application Specific Integrated Circuits), DPSs (Digital Signal Processors), DSPDs (Digital Signal Processing Devices), PLDs (Programmable Logic Devices), FPGAs (Field Programmable Gate Arrays), processors, controllers, micro-controllers, and micro-processors.

In the case of implementation by firmware or software, one embodiment of the present disclosure may be implemented in the form of modules, procedures, functions, and the like which perform the functions or operations described above. Software codes may be stored in the memory and activated by the processor. The memory may be located inside or outside of the processor and may exchange data with the processor by using various well-known means.

It is apparent for those skilled in the art that the present disclosure may be embodied in other specific forms without departing from the essential characteristics of the present disclosure. Therefore, the detailed descriptions above should be regarded as being illustrative rather than restrictive in every aspect. The technical scope of the present disclosure should be determined by a reasonable interpretation of the appended claims, and all of the modifications that fall within an equivalent scope of the present disclosure belong to the technical scope of the present disclosure.

MODE FOR INVENTION

It should be clearly understood by those skilled in the art that the present disclosure may be changed or modified in various ways without departing from the technical principles and scope of the present disclosure. Therefore, it is intended that the present disclosure includes changes and modifications of the present disclosure defined by appended claims and provided within their equivalent scope.

The present disclosure describes both of the apparatus disclosure and the method disclosure, and descriptions of the respective disclosures may be applied in a supplementary manner Various embodiments have been described in their best mode for implementing the present disclosure.

INDUSTRIAL APPLICABILITY

The present disclosure is used in a series of vehicle communication applications.

It should be clearly understood by those skilled in the art that the present disclosure may be changed or modified in various ways without departing from the technical principles and scope of the present disclosure. Therefore, it is intended that the present disclosure includes changes and modifications of the present disclosure defined by appended claims and provided within their equivalent scope.

The invention claimed is:

1. A communication method of a V2X communication device, the method comprising:
   accessing a first channel;
   receiving a network protocol data unit (NPDU) including a service advertisement message (SAM) on the first channel; and
   based on the service advertisement message, accessing a service channel and receiving service data,
   wherein the NPDU includes a N-header, a T-header, and a body,
   wherein the N-header provides network related information, the T-header provides transport related information, and the body includes the service advertisement message,
   wherein the service advertisement message provides service information and information about the service channel on which a service is provided.

2. The communication method of claim 1, wherein the service advertisement message includes a header part and a body part, wherein the header part includes at least one of SAM ID information, SAM count information, and SAM extension information, and the body part includes service information and channel information.

3. The communication method of claim 2, wherein the N-header includes channel busy ratio (CBR) information on the first channel and additional CBR information on an additional channel,
wherein the CBR information indicates a percentage of channel usage for a specific channel.

4. The communication method of claim 2, wherein the N-header includes at least one of multichannel access mode information and multichannel access interval information.

5. The communication method of claim 4, wherein the multichannel access mode information indicates at least one of an asynchronous multichannel access mode, an overlapping multichannel access mode, a sequential multichannel access mode, or a mixed multichannel access mode.

6. The communication method of claim 2, wherein the N-header includes at least one of transmission mode information of the service advertisement message and service channel number information on which the service advertisement message is transmitted.

7. The communication method of claim 6, wherein the transmission mode information of the service advertisement message indicates at least one of a first mode in which the service advertisement message is transmitted on a control channel, a second mode in which the service advertisement message is transmitted on one reference service channel, a third mode in which the service advertisement message is transmitted on all of SCHs, or a fourth mode in which channels are divided into a plurality of sub-bands, and the service advertisement message is transmitted on one reference service channel in the divided sub-band.

8. A V2X communication device comprising:
a memory configured to store data;
a communication unit configured to transmit and receive a radio signal; and
a processor configured to control the memory and the communication unit,
wherein the V2X communication device is configured to:
access a first channel;
receive a network protocol data unit (NPDU) including a service advertisement message (SAM) on the first channel; and
based on the service advertisement message, access a service channel and receive service data,
wherein the NPDU includes a N-header, a T-header, and a body,
wherein the N-header provides network related information, the T-header provides transport related information, and the body includes the service advertisement message,
wherein the service advertisement message provides service information and information about the service channel on which a service is provided.

9. The V2X communication device of claim 8, wherein the service advertisement message includes a header part and a body part,
wherein the header part includes at least one of SAM ID information, SAM count information, and SAM extension information, and the body part includes service information and channel information.

10. The V2X communication device of claim 9, wherein the N-header includes channel busy ratio (CBR) information on the first channel and additional CBR information on an additional channel,
wherein the CBR information indicates a percentage of channel usage for a specific channel.

11. The V2X communication device of claim 9, wherein the N-header includes at least one of multichannel access mode information and multichannel access interval information.

12. The V2X communication device of claim 11, wherein the multichannel access mode information indicates at least one of an asynchronous multichannel access mode, an overlapping multichannel access mode, a sequential multichannel access mode, or a mixed multichannel access mode.

13. The V2X communication device of claim 9, wherein the N-header includes at least one of transmission mode information of the service advertisement message and service channel number information on which the service advertisement message is transmitted.

14. The V2X communication device of claim 13, wherein the transmission mode information of the service advertisement message indicates at least one of a first mode in which the service advertisement message is transmitted on a control channel, a second mode in which the service advertisement message is transmitted on one reference service channel, a third mode in which the service advertisement message is transmitted on all of SCHs, or a fourth mode in which channels are divided into a plurality of sub-bands, and the service advertisement message is transmitted on one reference service channel in the divided sub-band.

* * * * *